US011932304B2

(12) United States Patent
Hendricks et al.

(10) Patent No.: US 11,932,304 B2
(45) Date of Patent: *Mar. 19, 2024

(54) STEER/BRAKE SYSTEM

(71) Applicant: HB PERFORMANCE SYSTEMS INC., Mequon, WI (US)

(72) Inventors: Clay M Hendricks, Lannon, WI (US); Andrew J Doubek, Grafton, WI (US)

(73) Assignee: HB Performance Systems Inc., Mequon, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,851

(22) Filed: May 25, 2022

(65) Prior Publication Data

US 2022/0281521 A1 Sep. 8, 2022

Related U.S. Application Data

(63) Continuation of application No. 16/784,206, filed on Feb. 6, 2020, now Pat. No. 11,370,487.

(Continued)

(51) Int. Cl.
*B62D 11/08* (2006.01)
*B60T 7/10* (2006.01)
(Continued)

(52) U.S. Cl.
CPC ............... *B62D 11/08* (2013.01); *B60T 7/10* (2013.01); *B60T 7/101* (2013.01); *B60T 7/102* (2013.01); *B60T 11/20* (2013.01); *B62D 11/005* (2013.01)

(58) Field of Classification Search
CPC ... B60T 7/08; B60T 7/10; B60T 7/101; B60T 7/102; B60T 7/104; B60T 7/02;
(Continued)

(56) References Cited

U.S. PATENT DOCUMENTS 2,241,214 A * 5/1941 Milster .................... B64C 25/48
60/567
2,254,890 A * 9/1941 Clarence ................ B62D 11/08
188/106 R (Continued)

FOREIGN PATENT DOCUMENTS

DE 4033577 A1 * 4/1992
JP 01016476 A * 1/1989

*Primary Examiner* — Robert A. Siconolfi
*Assistant Examiner* — San M Aung
(74) *Attorney, Agent, or Firm* — Zimmerman Intellectual Property Services LLC

(57) ABSTRACT

A steer/brake system for a vehicle (with wheels and/or tracks) is disclosed. The system may comprise a steering system with an operator control and braking system for each side of the vehicle with a master cylinder for the brake mechanism and an interface between the braking system and the operator control. Operation may provide a phase where the interface is at least partially engaged and force may be applied through the interface to the master cylinder to engage the brake mechanism to provide modulation for the operator control. A steering emulation system may comprise the interface and a compliant element configured to provide modulation for the operator control. The system may comprise a shared hydraulic system; the brake mechanism may comprise the steering brake mechanism and the service brake mechanism.

20 Claims, 23 Drawing Sheets

Related U.S. Application Data

(60) Provisional application No. 62/802,705, filed on Feb. 7, 2019.

(51) Int. Cl.
  *B60T 11/20* (2006.01)
  *B62D 11/00* (2006.01)

(58) Field of Classification Search
  CPC .......... B60T 11/04; B60T 11/06; B60T 11/20; B60T 11/21; B60T 2260/02; B62D 11/08; B62D 11/005; B60W 30/18; B60W 30/18181; B60W 2540/18; B60W 2710/18; B60W 2710/20; Y10T 74/2022; Y10T 74/18952; Y10T 74/20226; Y10T 74/20268
  USPC ..................................... 188/16; 180/6.2, 333
  See application file for complete search history.

(56) References Cited

U.S. PATENT DOCUMENTS

| | | | | |
|---|---|---|---|---|
| 2,794,609 | A | * | 6/1957 | Perry ..................... B64C 29/02 244/100 R |
| 3,220,189 | A | * | 11/1965 | Caramanna ............. B60T 11/06 74/516 |
| 4,407,547 | A | * | 10/1983 | Edwards ................ B62D 11/08 303/9.61 |
| 5,553,684 | A | * | 9/1996 | Bolduc ................. B60W 30/18 180/321 |
| 2007/0084646 | A1 | * | 4/2007 | Scruggs ............... B62D 11/006 180/333 |
| 2011/0056327 | A1 | * | 3/2011 | Mazzucchi ............ B62D 11/08 74/512 |
| 2021/0053537 | A1 | | 2/2021 | Braswell et al. |

* cited by examiner

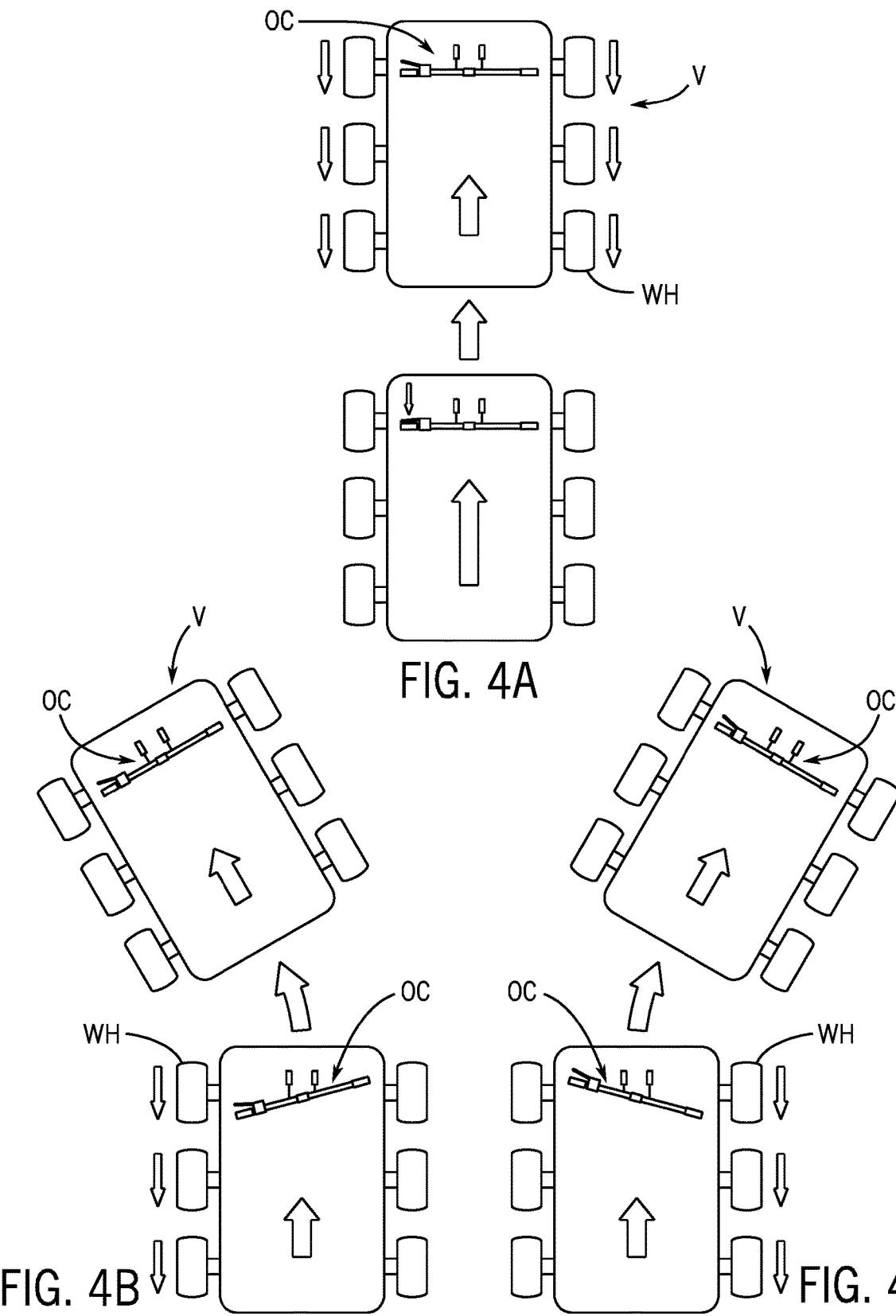

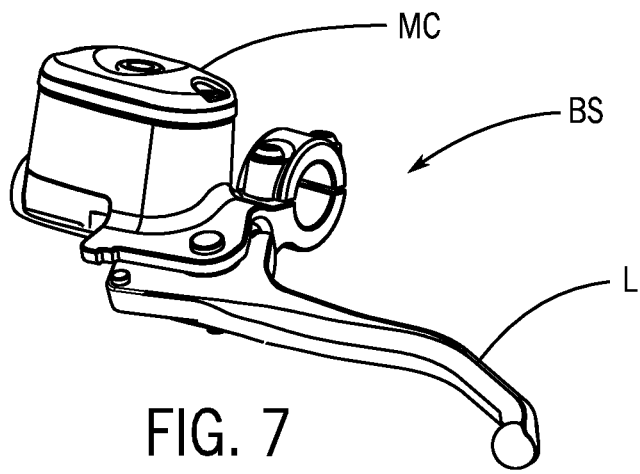
FIG. 7
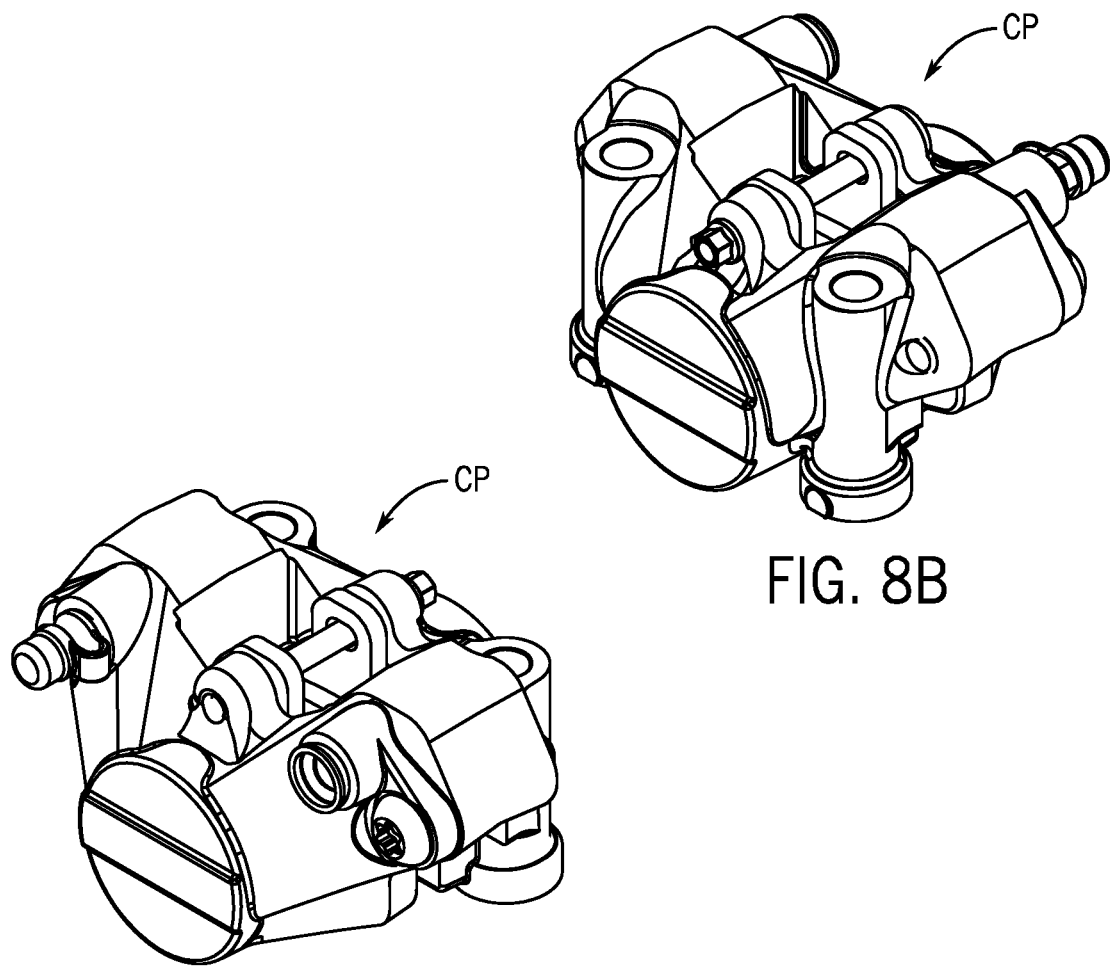
FIG. 8B
FIG. 8A

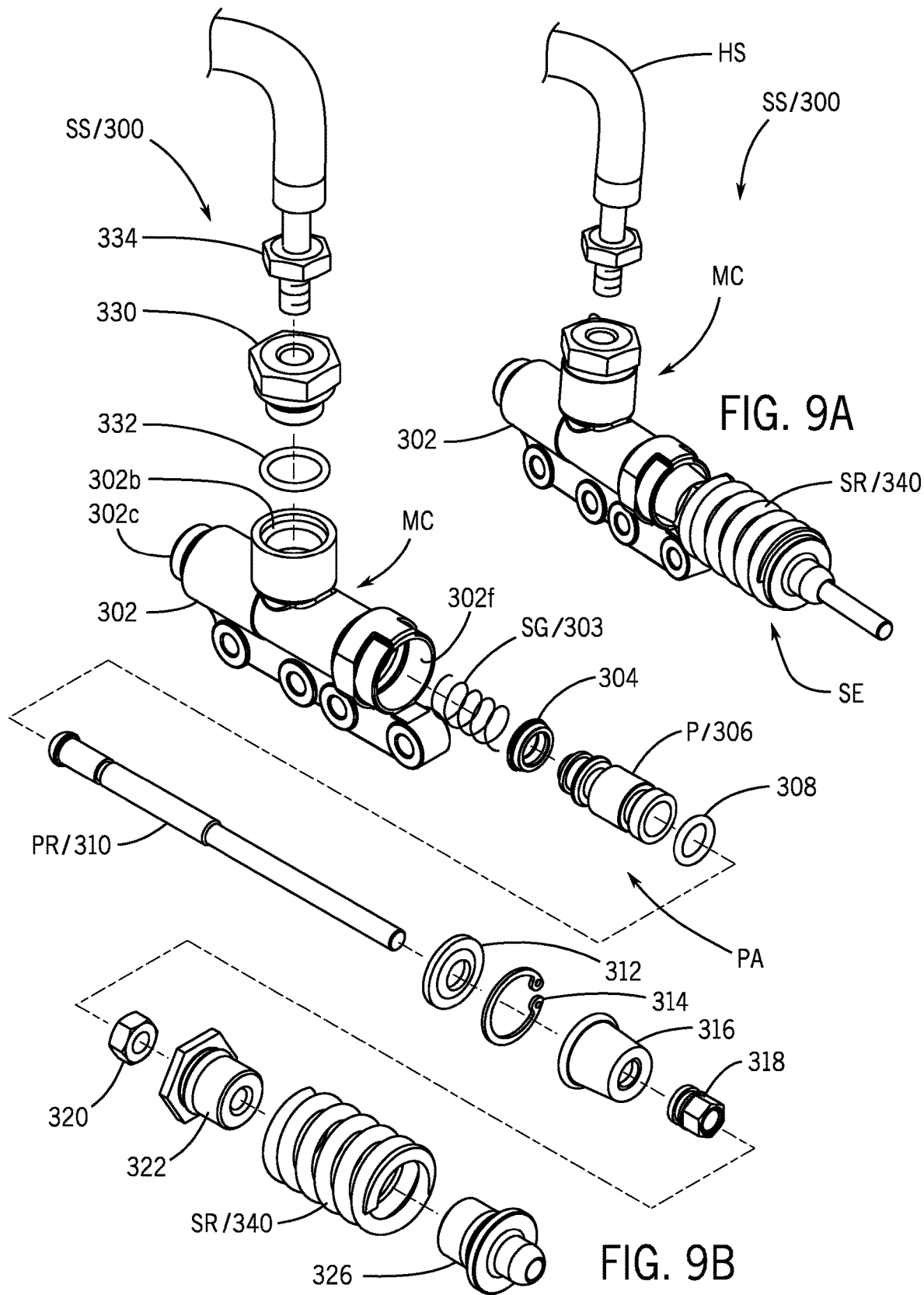

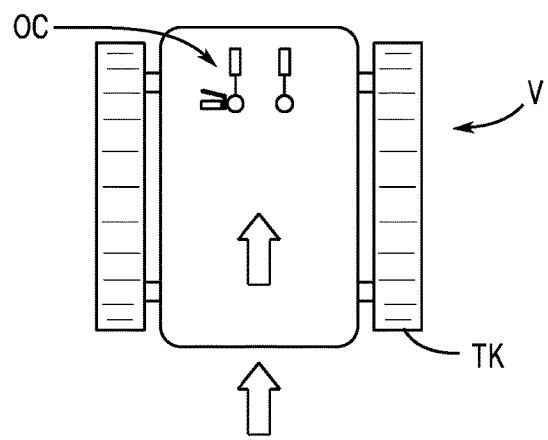
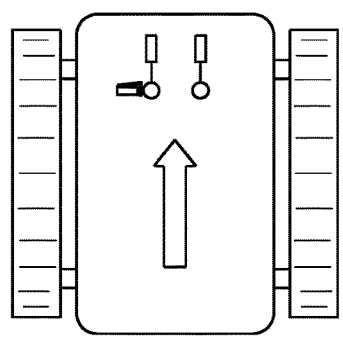
FIG. 17A
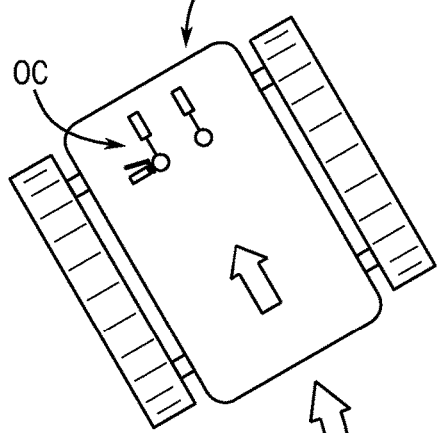
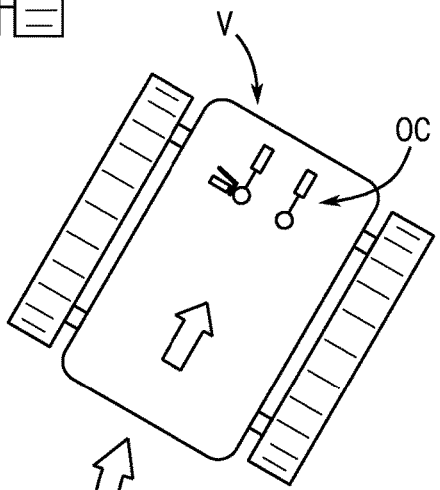
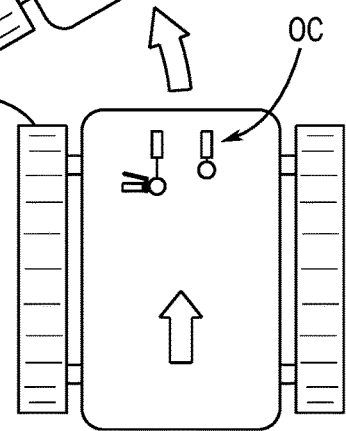
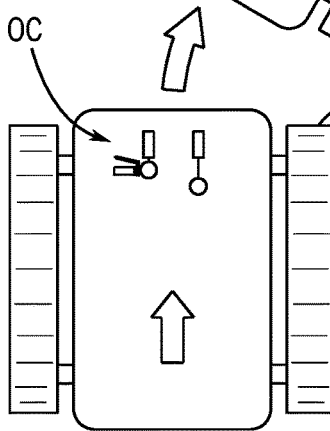
FIG. 17B
FIG. 17C

STEER/BRAKE SYSTEM

CROSS-REFERENCE TO RELATED APPLICATIONS

The present invention is a continuation of U.S. patent application Ser. No. 16/784,206 titled "STEER/BRAKE SYSTEM" filed on Feb. 6, 2020, which claims priority to U.S. Provisional Patent Application No. 62/802,705 titled "STEER/BRAKE SYSTEM" filed on Feb. 7, 2019.

The present invention claims priority to and incorporates by reference in full the following patent applications: U.S. patent application Ser. No. 16/784,206 titled "STEER/BRAKE SYSTEM" filed on Feb. 6, 2020; (b) U.S. Provisional Patent Application No. 62/802,705 titled "STEER/BRAKE SYSTEM" filed on Feb. 7, 2019.

FIELD

The present invention relates to steer/brake system for a vehicle.

BACKGROUND

It is known to provide a steer/brake system for a vehicle in which steering and braking are actuated at a brake mechanism by an operator control. In such known systems, the "feel" at the operator control for steering is typically provided directly by the braking mechanism (e.g. directly through the steer/brake system). The "feel" provided to the operator for steering in such vehicles may not match what the operator may generally expect for steering of a utility/work/sport vehicle.

It would be advantageous to provide an improved steer/brake system for a vehicle in comprising a system/mechanism to facilitate the modification of the "feel" provided to the operator for steering at the operator control. It would also be advantageous to provide an improved steer/brake system in which the "feel" provided to the operator for steering at the operator control is designed/configured (or can be adjusted/tuned) to emulate more closely a feel that is generally expected for steering of a utility/work/sport vehicle.

SUMMARY

The present invention relates to an improved steer/brake system for a vehicle.

The present invention relates to a steering system for a vehicle having wheels configured to be steered under control of an operator by slowing at least one wheel on one side of the vehicle relative at least one wheel on another side of the vehicle comprising (a) an operator control; (b) a braking system for each side of the vehicle comprising a master cylinder to operate a brake mechanism for braking a wheel under operation of the operator control; (c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism; the compliant element of the interface may be configured to provide modulation for the operator control; the compliant element of the interface may comprise a spring mechanism between the operator control and the master cylinder configured to provide modulation for the operator control for the second phase of operation; the braking system may be configured to facilitate steering of the vehicle through the operator control and interface by braking of at least one wheel on one side of the vehicle by the braking mechanism through the interface. The brake mechanism may comprise a caliper and disc. The spring mechanism of the compliant element may comprise a spring. Modulation may be provided by stiffness of the spring. Modulation may be provided by hydraulic stiffness of the braking system. In the first phase the spring may be uncompressed. The first phase may comprise a dead stroke of the braking system; the spring of the compliant element of the interface is engaged in a transition from the first phase to the second phase. The spring mechanism of the compliant element of the interface may comprise at least one of (1) a coil spring mechanism; (2) a set of coil springs; (3) a torsion spring; (4) a torsion bar; (5) a leaf spring; (6) a set of flexible master cylinder mounts; (7) an elastomeric member; (8) a set of disc springs; (9) a wave spring; (10) a dual spring mechanism; (11) a spring configured to at least partially act on a pushrod for a piston assembly of the braking system; (12) a dual spring mechanism configured to at least partially act on a pushrod for a piston assembly of the braking system. In the second phase the spring of the spring mechanism of the compliant element of the interface may be at least partially compressed. The spring of the spring mechanism of the compliant element of the interface may be substantially compressed to a limit at a transition from the second phase to the third phase. In the third phase the spring may be configured to stop at a travel limit. In the third phase operation of the braking system is a function of the hydraulic stiffness of the braking system. In the third phase there may be no modulation from the spring mechanism of the compliant element of the interface for the operator control of the braking system. The operator control may comprise at least one of (a) a rotatable control or (b) a handlebar or (c) a set of steer levers or (d) a turnable control or (e) a push-pull control. The brake mechanism may comprise a steering brake mechanism; and the braking system may comprise a service brake mechanism for slowing and stopping the vehicle. The braking system may comprise a shared hydraulic system for operation of the steering brake mechanism and the service brake mechanism. The brake mechanism may comprise the steering brake mechanism and the service brake mechanism. The braking system may comprise a shared hydraulic system with a dual-input master cylinder; the dual-input master cylinder may comprise a coupling to the operator control and a reservoir for hydraulic fluid; the dual-input master cylinder may be configured to supply hydraulic fluid to actuate the steering brake mechanism and the service brake mechanism.

The present invention relates to a steering system for a vehicle having tracks configured to be steered under control of an operator by slowing at least one track on one side of the vehicle relative at least one track on another side of the vehicle comprising (a) an operator control; (b) a braking system for each side of the vehicle comprising a master cylinder to operate a brake mechanism for braking a track under operation of the operator control; (c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism; the compliant element of the interface may be configured to provide modulation for the operator control; the compliant element of the interface may comprise a spring mechanism between the operator control and the master cylinder configured to provide modulation for the operator control for the second phase of operation; the braking system may be configured to facilitate steering of the vehicle through the operator control and interface by braking of at least one track on one side of the vehicle by the braking mechanism through the interface.

The present invention relates to a steering system for a vehicle configured to be steered under control of an operator by slowing at one side of the vehicle relative to another side of the vehicle comprising (a) an operator control; (b) a braking system for each side of the vehicle comprising a master cylinder to operate a brake mechanism for braking under operation of the operator control; (c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism; the compliant element of the interface may be configured to provide modulation for the operator control; the compliant element of the interface may comprise a mechanism between the operator control and the brake mechanism configured to provide modulation for the operator control for the second phase of operation; the braking system may be configured to facilitate steering of the vehicle through the operator control and interface by braking of one side of the vehicle by the braking mechanism through the interface; the mechanism of the compliant element of the interface may comprise at least one of (1) a spring between the operator control and the master cylinder; (2) a spring mechanism; (3) a spring mechanism between the operator control and the master cylinder; (4) a coil spring mechanism between the operator control and the master cylinder; (5) a torsion spring between the operator control and the master cylinder; (6) a torsion bar between the operator control and the master cylinder; (7) a steer arm between the operator control and the master cylinder; (8) a leaf spring between the operator control and the master cylinder; (9) a set of flexible master cylinder mounts; (10) an elastomeric member between the operator control and the master cylinder; (11) a set of disc springs between the operator control and the master cylinder; (12) a wave spring between the operator control and the master cylinder; (13) a set of coil springs; (14) a dual spring mechanism; (15) a mechanism between the operator control and the master cylinder configured to at least partially act on a pushrod for a piston assembly of the braking system; (16) a spring mechanism between the operator control and the master cylinder configured to at least partially act on a pushrod for a piston assembly of the braking system The present invention relates to a steering system for a vehicle having wheels configured to be steered under control of an operator by slowing at least one wheel on one side of the vehicle relative at least one wheel on another side of the vehicle comprising an operator control and a braking system for each side of the vehicle comprising a master cylinder to operate a brake mechanism comprising a caliper and disc for braking a wheel under operation of the operator control and an interface comprising a compliant element between the braking system and the operator control configured to provide for operation of the braking system for steering under operator control in (1) a first phase where the interface is engaged before the master cylinder has engaged the caliper and disc of the brake mechanism; (2) a second phase where the interface is at least partially engaged and force is applied through the interface to the master cylinder to engage the caliper with the disc of the brake mechanism to provide modulation for the operator control; (3) a third phase where the interface is fully engaged and force is applied directly to the master cylinder to engage the caliper with the disc of the brake mechanism; the master cylinder for the braking system for each side of the vehicle may comprise a dual-input master cylinder; the interface may comprise a compliant element configured to provide modulation for the operator control; the braking system is configured to facilitate steering of the vehicle through the operator control and interface by braking of at least one wheel on one side of the vehicle by the braking mechanism through the interface. The compliant element may comprise a spring; modulation may be provided by stiffness of the spring; modulation may be provided by hydraulic stiffness of the braking system. In the first phase the spring may be uncompressed; the first phase may comprise a dead stroke of the braking system. The interface may be engaged in a transition from the first phase to the second phase; in the second phase the spring may be at least partially compressed. The interface may be disengaged at a transition from the second phase to the third phase; in the third phase the spring may be at a travel limit; in the third phase the function of the braking system may be a function of the hydraulic stiffness of the braking system; in the third phase there may be no modulation from the interface for the operator control of the braking system. In the first phase there may be no modulation from the interface for the operator control of the braking system. In the third phase the spring may be in contact with a spring perch. The operator control may comprise at least one of a rotatable control or a handlebar or a set of steer levers or a turnable control or a push-pull control. The brake mechanism may comprise a steering brake mechanism; and the braking system may comprise a service brake mechanism for slowing and stopping the vehicle. The braking system may comprise a shared hydraulic system for operation of the steering brake mechanism and the service brake mechanism. The brake mechanism may comprise the steering brake mechanism and the service brake mechanism. The braking system may comprise a shared hydraulic system; the dual-input master cylinder may comprise a coupling to the operator control and a reservoir for hydraulic fluid; the dual-input master cylinder may be configured to supply hydraulic fluid to actuate the steering brake mechanism and the service brake mechanism.

The present invention relates to a steering system for a vehicle having tracks configured to be steered under control of an operator by slowing at least one track on one side of the vehicle relative at least one track on another side of the vehicle comprising an operator control and a braking system for each side of the vehicle comprising a master cylinder to operate a brake mechanism comprising a caliper and disc for braking a track under operation of the operator control and an interface comprising a compliant element between the braking system and the operator control configured to provide for operation of the braking system for steering under operator control in (1) a first phase where the interface is engaged before the master cylinder has engaged the caliper and disc of the brake mechanism; (2) a second phase where the interface is at least partially engaged and force is applied through the interface to the master cylinder to engage the caliper with the disc of the brake mechanism to provide modulation for the operator control; (3) a third phase where the interface is fully engaged and force is applied directly to the master cylinder to engage the caliper with the disc of the brake mechanism; the master cylinder for the braking system for each side of the vehicle may comprise a dual-input master cylinder; the interface may comprise a compliant element configured to provide modulation for the operator control; the braking system facilitates steering of the vehicle through the operator control and interface by braking of at least one track on one side of the vehicle by the braking mechanism through the interface.

The present invention relates to a steering system for a vehicle having wheels configured to be steered under control of an operator by slowing at least one wheel on one side of the vehicle relative at least one wheel on another side of the vehicle. The steering system may comprise an operator control and a braking system for each side of the vehicle comprising a master cylinder to operate a brake mechanism comprising a caliper and disc for braking a wheel under operation of the operator control and an interface comprising a compliant element between the braking system and the operator control. The interface may be configured to provide for operation of the braking system for steering under operator control in (1) a first phase where the interface may be engaged before the master cylinder has engaged the caliper and disc of the brake mechanism; (2) a second phase where the interface may be at least partially engaged and force may be applied through the interface to the master cylinder to engage the caliper with the disc of the brake mechanism to provide modulation for the operator control; (3) a third phase where the interface may be fully engaged and force may be applied directly to the master cylinder to engage the caliper with the disc of the brake mechanism.. The compliant element of the interface may be configured to provide modulation for the operator control. The braking system may facilitate steering of the vehicle through the operator control and interface by braking of at least one wheel on one side of the vehicle by the braking mechanism through the interface. The compliant element may comprise a spring. Modulation may be provided by the stiffness of the spring. Modulation may be provided by the hydraulic stiffness of the braking system. In the first phase the spring may be uncompressed; the first phase may comprise a dead stroke of the braking system. The interface may be engaged in a transition from the first phase to the second phase. In the second phase the spring may be at least partially compressed. The interface may be disengaged at a transition from the second phase to the third phase. In the third phase the spring may be fully compressed; in the third phase the function of the braking system may be a function of the hydraulic stiffness of the braking system; in the third phase there may be no modulation (e.g. no further modulation from the interface of the steer system) for the operator control of the braking system. In the first phase there may be no modulation (e.g. modulation is not yet engaged at the interface of the steer system) for the operator control of the braking system. In the third phase the spring may be in contact with a spring perch. The operator control may comprise a rotatable control. The operator control may comprise a handlebar. The brake mechanism may comprise a steering brake mechanism; and the braking system may comprise a service brake mechanism for slowing and stopping the vehicle. The braking system may comprise a shared hydraulic system for operation of the steering brake mechanism and the service brake mechanism. The brake mechanism may comprise the steering brake mechanism and the service brake mechanism. The braking system may comprise a separate hydraulic system for operation of the steering brake mechanism and the service brake mechanism. The interface may be configured to engage a first master cylinder for a first set of wheels to steer the vehicle in a first direction and a second master cylinder for a second set of wheels to steer the vehicle in the second direction. The first master cylinder may be configured to be engaged by rotation of the operator control in a first direction and the second master cylinder may be configured to be engaged by rotation of the operator control in a second direction. The interface may comprise a steer plate coupled to a pushrod for each master cylinder. The interface may comprise an emulation spring. The steering emulation system may comprise the interface and a compliant element. Modulation may comprise the interface providing a modulated relationship between steering angle and torque at the operator control that is different than an unmodulated relationship between steering angle and torque at the operator control; modulation may be provided at the second phase to emulate a steering effect; modulation may comprise a steering feel for the operator of the vehicle at the operator control. Modulation may comprise stiffness enhancement. The interface of the steer system may comprise at least one of (1) a compliant element; (2) a spring; (3) a torsion bar; (4) a compliant element in a piston assembly; (5) an elastomeric element; (6) a coil spring; (7) a flat spring; (8) a cone washer; (9) an air spring; (10) a Belleville spring; (11) a spring washer; (12) a wave spring; (13) a clock spring; (14) a torsion spring; (15) a flexible steer plate; (16) a bump stop; (17) rubber block; (18) a compliant mount; (19) a linkage; (20) a leaf spring; (21) an adjustable steer plate; (22) an adjustable compliant element; (23) a combination of springs; (24) a clevis and spring; (25) multiple compliant elements.

The present invention relates to a steering/braking system for a vehicle having wheels configured to be steered under control of an operator by slowing at least one wheel on one side of the vehicle relative at least one wheel on another side of the vehicle. The steering/braking system may comprise an operator control; a braking system for braking the vehicle comprising a master cylinder to operate a brake mechanism comprising a caliper and disc for braking a wheel under operation of the operator control; a steering system for steering the vehicle comprising a master cylinder for each side of the vehicle to operate a brake mechanism comprising a caliper and disc for braking a wheel under operation of the operator control. The braking system may comprise a first hydraulic system comprising a fluid circuit for operation of the brake mechanism for slowing and stopping the vehicle; the steering system may comprise a second hydraulic system comprising a fluid circuit for operation of the brake mechanism for steering the vehicle; the fluid circuit for the first hydraulic system may be combined with the fluid circuit for the second hydraulic system. The operator control may comprise a handlebar with a lever to provide brake control and rotatable to provide steering control. The steering system may comprise an interface configured to engage a first master cylinder for a first set of wheels to steer the vehicle in a first direction and a second master cylinder for a second set of wheels to steer the vehicle in the second direction. The interface (of the steer system) may be configured for modulation of an effect at the operator control; the interface may be configured to provide a modulated relationship between steering angle and torque at the operator control that may be different than an unmodulated relationship between steering angle and torque at the operator control. The interface (of the steer system) may comprise at least one of (1) a compliant element; (2) a spring; (3) a torsion bar; (4) a compliant element in a piston assembly; (5) an elastomeric element; (6) a coil spring; (7) a flat spring; (8) a cone washer; (9) an air spring; (10) a Belleville spring; (11) a spring washer; (12) a wave spring; (13) a clock spring; (14) a torsion spring; (15) a flexible steer plate; (16) a bump stop; (17) rubber block; (18) a compliant mount; (19) a linkage; (20) a leaf spring; (21) an adjustable steer plate; (22) an adjustable compliant element; (23) a combination of springs; (24) a clevis and spring; (25) multiple compliant elements.

FIGURES

FIGS. 4A through 4C are schematic diagrams of braking/steering operation for a vehicle according to an exemplary embodiment.

FIG. 7 is a schematic perspective view of a brake control for a braking system according to an exemplary embodiment.

FIGS. 8A and 8B are a schematic perspective view of a brake mechanism/caliper for a braking system according to an exemplary embodiment.

FIG. 9A is a schematic perspective view of a steer control/system for a braking system according to an exemplary embodiment.

FIG. 9B is a schematic perspective exploded view of the steer control/system for the braking system according to an exemplary embodiment.

FIGS. 17A through 17C are schematic diagrams of braking/steering operation for a vehicle according to an exemplary embodiment.

DESCRIPTION

Figure 1:
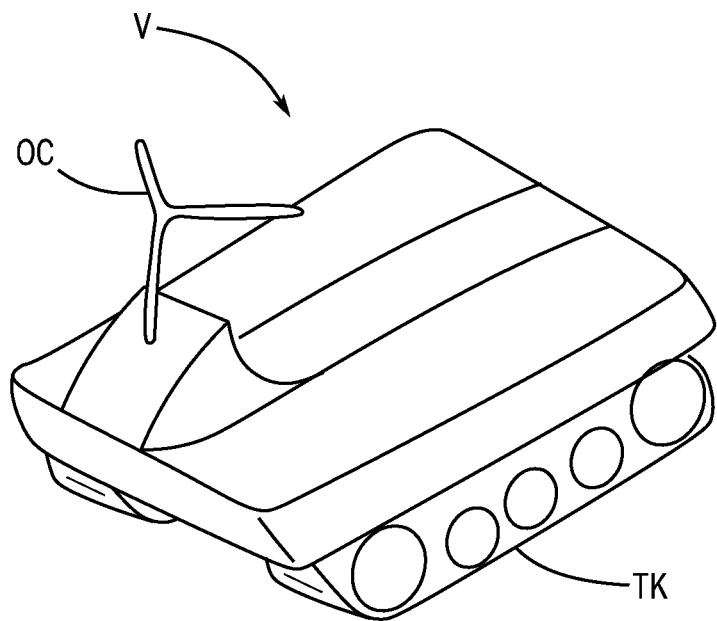
FIGS. 1 and 2 are schematic perspective views of a vehicle with a steer/brake system according to an exemplary embodiment.
Figure 2:
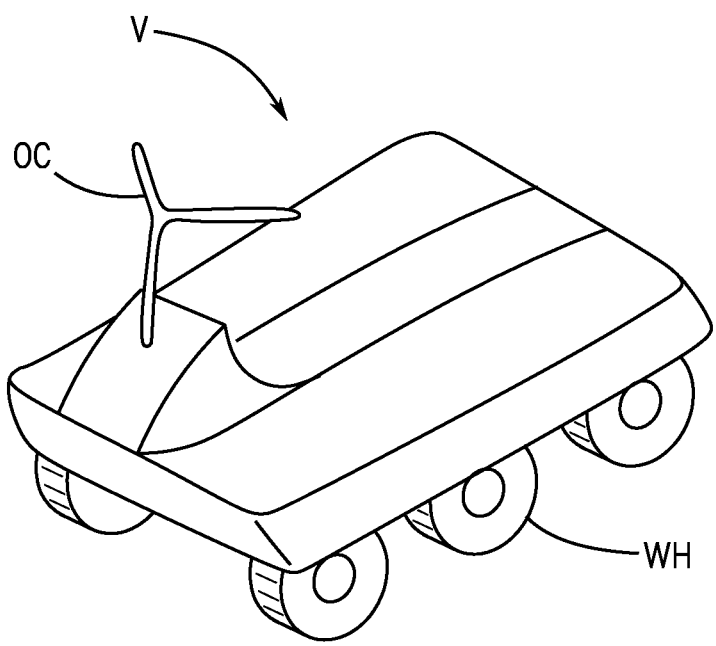

Referring to FIGS. 1 and 2, a utility vehicle V is shown. As shown schematically according to an exemplary embodiment in FIGS. 1 and 2, the vehicle V may be of a generally conventional form comprising a chassis (with a powertrain and transmission) on tracks TK (see FIG. 1) and/or wheels WH (see FIG. 2) and a body (with seating such as for an operator and optionally passengers and with storage) and operator controls OC (e.g. used by the operator for operation of the vehicle).

As shown schematically in FIGS. 1, 2, 3A-3C, 4A-4C, 5A, 6A and 17A-17C, the operator control OC for the vehicle V may be provided on a structure shown as handlebar H (or other structure such as levers, skid-steer levers, pedals, wheel, etc.); the operator control may be configured for steering control (e.g. control of a steer/brake system SS/BS shown as comprising a set of master cylinders MC coupled by a steer plate SP actuated through rotation of the handlebar H) and for brake control (e.g. control of a brake system shown as comprising a master cylinder MC actuated by a brake lever arrangement L on the handlebar H). See also FIGS. 7, 13 and 14A-14C. As indicated schematically in FIGS. 3A-3C and 4A-4C, the steering control SC and the brake control BC of the operator control OC on the handlebar H operate through a hydraulic system providing the steer/brake system SS/BS (e.g. in an arrangement with master cylinder MC and a brake mechanism with caliper/disc arrangement DC) operating at wheels WH of the vehicle V. See also FIGS. 5A-5B, 6A-6B and 13 and 14A-14C. As indicated schematically in FIGS. 1-2 and 3A, the vehicle V may also provide for gear/shift control by the operator (e.g. by actuation of transmission/differential DF coupled to the engine/powertrain such as by chain drive arrangement to wheels). See also FIG. 5A-5B and 6A-6B.

As shown schematically/generally according to an exemplary embodiment in FIGS. 2 and 3A-3C, the vehicle V may be configured with a steer/brake system BS/SS coupled at the operator control OC (with brake control BC and steer control SC actuating a master cylinder arrangement MC of a hydraulic system) to actuate a brake mechanism (e.g. a disc/caliper arrangement DC coupled to the master cylinder arrangement MC and hydraulic system through hose system HS) at wheels WH of the vehicle V. See also FIGS. 5A-5B and 6A-6B.

As shown schematically in FIGS. 2, 3A-3C, 4B-4C, 5A-5B, 6A-6B, 9A-9B and 10A-10B, the steer/brake system for the vehicle is configured with a steering control system/mechanism comprising an interface shown as steering emulation system SE to provide adjustable (e.g. tuned/tunable) emulation of steering action for the operator at the operator control notwithstanding that steering of the vehicle is implemented through a brake mechanism. See also FIGS. 11A-11E, 12A-12B, 15, 16, 17A-17C and 26A-26E.

As indicated schematically, the operator control may comprise a rotatable control, a handlebar, a set of steer levers, a turnable control, a push-pull control, a steering wheel/post, etc. See FIGS. 1-2, 3A-3C, 4A-4C, 17A-17C and 18A-18B.

Figure 3A:
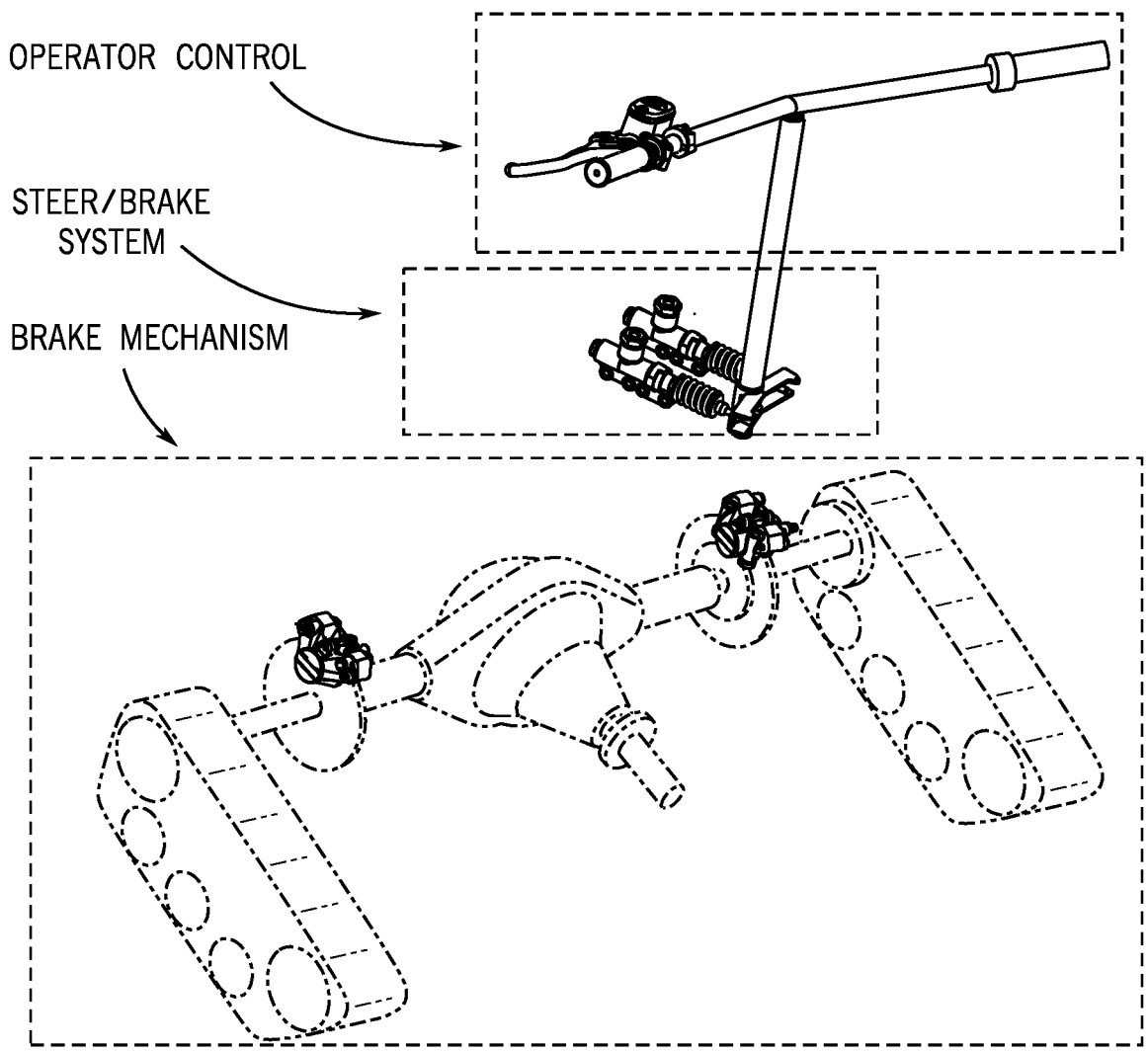
FIG. 3A is a schematic perspective view of a braking system for a vehicle according to an exemplary embodiment.
Figure 3B:
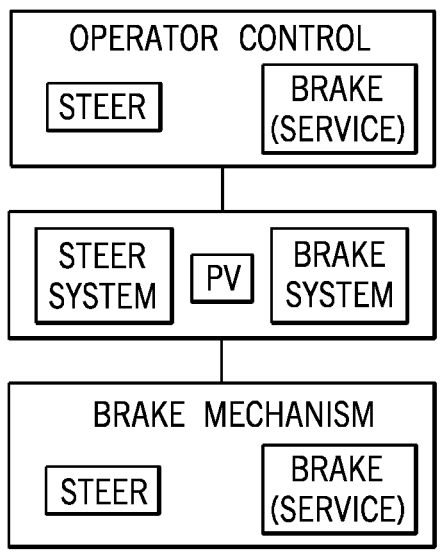
FIGS. 3B and 3C are system block diagrams of a braking system for a vehicle according to an exemplary embodiment.
Figure 3C:
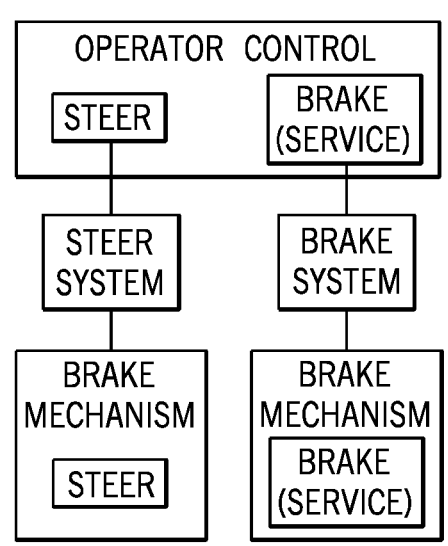

As indicated schematically according to an exemplary embodiment in FIGS. 3A and 3B-3C, the operator control of the vehicle is configured to control the function of braking through a service brake system/mechanism and to control the function of steering through a steer brake system/mechanism. See also FIGS. 4A-4C, 5A-5B and 6A-6B. As shown schematically in FIG. 3B, the steer/brake system may be configured in a combined hydraulic system to actuate a single brake mechanism (e.g. a single disc/caliper arrangement DC for steer system and brake system) for wheels on each side of the vehicle; the steer/brake system may comprise a control element shown as proportioning valve PV to modulate hydraulic pressure for the steer system and brake system. See also FIGS. 5A-5B and 31. As shown schematically in FIGS. 3A and 3C, the steer/brake system may be configured in a separated hydraulic system to actuate a separate brake mechanism for steering (e.g. disc/caliper arrangement DCs for steer system) for wheels on each side of the vehicle and a separate brake mechanism for braking (e.g. disc/caliper arrangement DCb for brake system) for all wheels of the vehicle. See also FIGS. 6A and 6B.

As shown schematically in FIGS. 3A-3C and 4A, the function of braking (e.g. service brake system/mechanism) is under the direction of the vehicle operator at the operator control OC through the brake control BC (e.g. brake control lever L on the handlebar H) which actuates the hydraulic/brake system BS with master cylinder MC on a caliper/disc arrangement DC to slow/stop rotation of the wheels WH on each side of the vehicle. See also FIGS. 1-2, 5A-5B and 6A-6B. As indicated schematically in FIG. 4A, actuation of the brake control of the operator control OC will allow coordinated/dual slowing and/or stopping of the wheels WH on both sides of the vehicle V.

As shown schematically in FIGS. 3A and 4B-4C, the function of steering (e.g. steer brake system/mechanism) is under the direction of the vehicle operator at the operator control OC through rotation of the handlebar H as a steering control SC (e.g. coupled though post PT/shaft ST to a steer plate SP) which actuates the hydraulic steer/brake system SS with a master cylinder MC on a caliper/disc arrangement DC to slow rotation of the wheels WH on one side of the vehicle (e.g. separate slowing of the wheels on one side of the vehicle relative to the other side of the vehicle). See also FIGS. 1-2, 5A-5B, 6A-6B, 13 and 14A-14B. As indicated schematically in FIGS. 4B and 4C, rotation of the steering control of the operator control OC will allow relative/differential slowing of the wheels WH on one side of the vehicle V to facilitate steering/turning of the vehicle V to that side during driving/operation and use. See also FIGS. 13 and 14A-14B.

Figures 5A, 5B:
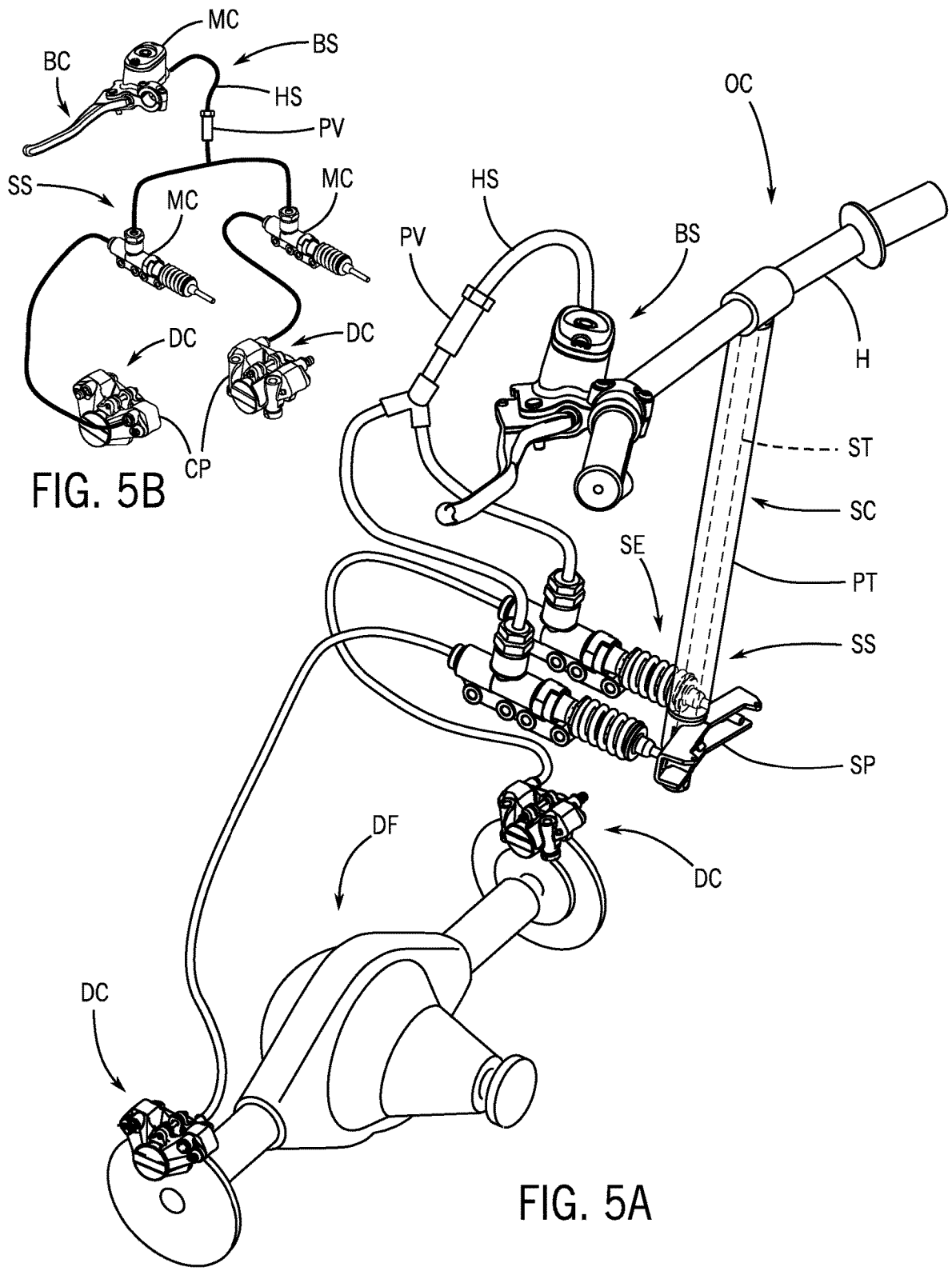
FIGS. 5A and 5B are schematic perspective views of a steer/brake system for a vehicle according to an exemplary embodiment.

As shown schematically according to an exemplary embodiment in FIGS. 5A and 5B, the steer/brake system may comprise a combined hydraulic system through a hose system HS to actuate a single brake mechanism (e.g. a single disc/caliper arrangement DC for steer system and brake system) for wheels on each side of the vehicle; the steer/brake system may comprise a control element shown as proportioning valve PV to modulate hydraulic pressure for the steer system and brake system. See also FIG. 3B. As indicated schematically in FIGS. 5A and 5B, the operator control OC at handlebar H for the brake system BS comprises a brake control BC with a lever to actuate through a master cylinder MC coupled through the hose system HS to the brake mechanism comprising the disc/caliper arrangement DC (with caliper CP coupled to the hose system HS and disc DS); the brake system BS is configured for coordinated slowing/stopping of the wheels on both sides of the vehicle (e.g. to facilitate braking). See also FIG. 4A. As indicated schematically in FIGS. 5A and 5B, the operator control OC at the handlebar for the steer/brake system SS comprises a steering control SC actuated by rotation of handlebar H at post PT with shaft ST coupled to a steer plate SP connected to a set of master cylinders MC; each master cylinder MC is coupled through the hose system to the brake mechanism comprising the disc/caliper arrangement DC (with caliper CP coupled to the hose system and disc DS); the steering system SS is configured for separate/relative slowing of the wheels on one side of the vehicle (e.g. to facilitate steering/turning). See also FIGS. 4B-4C, 11A-11E, 12A-12B, 13 and 14A-14C.

Figure 6B:
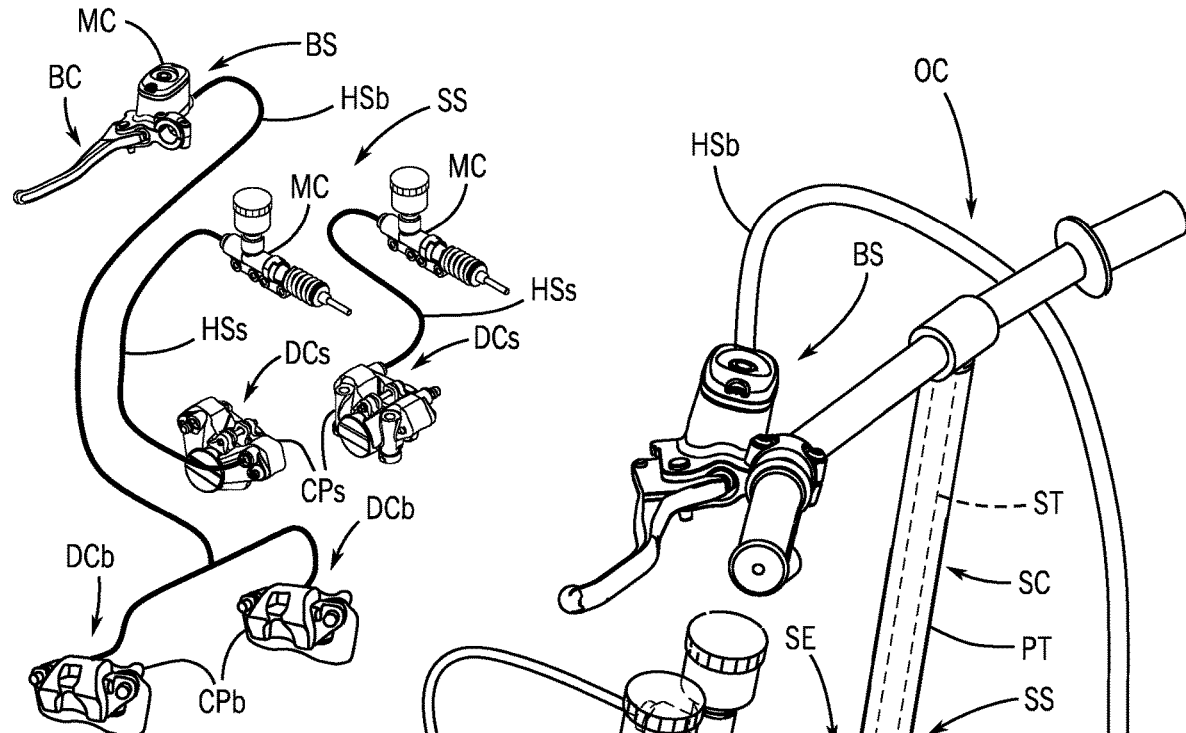
FIGS. 6A and 6B are schematic perspective views of a steer/brake system for a vehicle according to an exemplary embodiment.
Figure 6A:
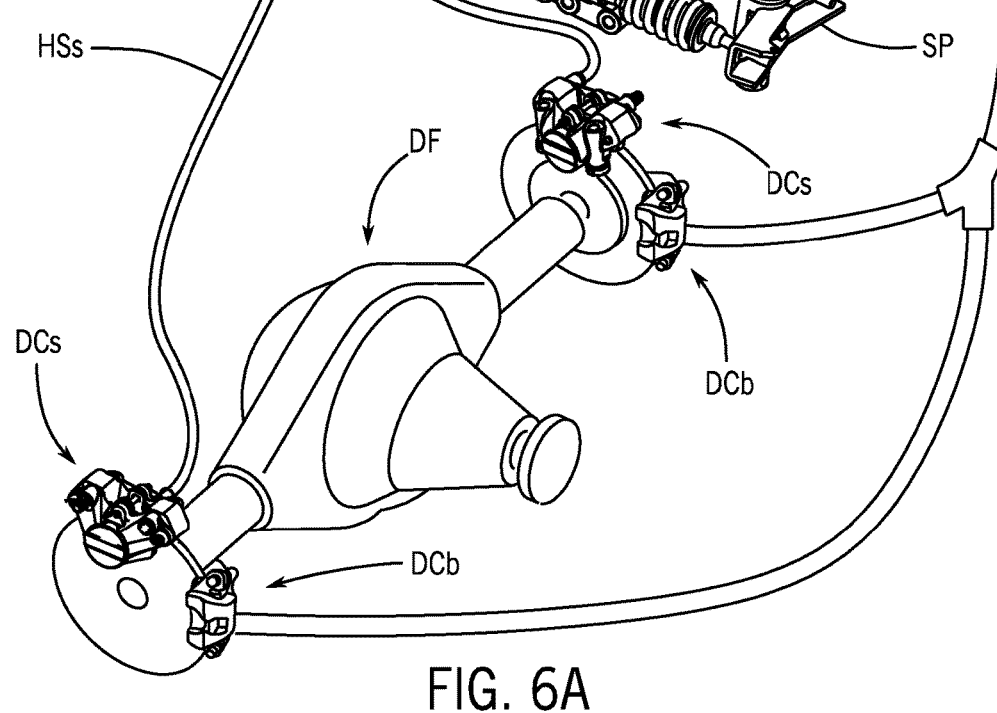

As shown schematically according to an exemplary embodiment in FIGS. 6A and 6B, the steer/brake system may comprise a separated hydraulic system to actuate a separate brake mechanism for steering (e.g. disc/caliper arrangement DCs for steer system) for wheels on each side of the vehicle and a separate brake mechanism for braking (e.g. disc/caliper arrangement DCb for brake system) for wheels on each side of the vehicle. See also FIGS. 3A and 3C. As indicated schematically in FIGS. 6A and 6B, the operator control OC at handlebar H for the brake system BS comprises a brake control BC with a lever to actuate a master cylinder MC coupled through a separate hose system HSb to the brake mechanism comprising the disc/caliper arrangement DCb (with caliper CP coupled to the hose system HS and disc DS); the brake system BS is configured for coordinated slowing/stopping of the wheels on both sides of the vehicle (e.g. to facilitate braking). See also FIG. 4A. As indicated schematically in FIGS. 6A and 6B, the operator control OC at handlebar for the steer/brake system SS comprises a steering control SC actuated by rotation of handlebar H at post PT with shaft ST coupled to a steer plate SP connected to a set of master cylinders MC; each master cylinder MC is coupled through a separate hose system HSs to the brake mechanism comprising the disc/caliper arrangement DCs (with caliper CP coupled to the hose system and disc DS); the steering system SS is configured for separate/relative slowing of the wheels on one side of the vehicle (e.g. to facilitate steering/turning). See also FIGS. 4B-4C, 11A-11E, 12A-12B, 13 and 14A-14C.

Referring to FIG. 7, the brake control BC for the brake system BS is shown schematically according to an exemplary embodiment. See also FIGS. 3A-3C, 5A-5B and 6A-6B.

Referring to FIGS. 9A-9B and 10A-10B, the steering control SC/300 for the steer/brake system SS is shown schematically according to an exemplary embodiment. See also FIG. 3A-3C, 5A-5B, 6A-6B, 11A-11E, 12A-12B, 13 and 14A-14C. As indicated schematically, each master cylinder assembly MC on one side of the frame is coupled to a corresponding brake mechanism (e.g. disc/caliper arrangement) for the wheels on one side of the vehicle (e.g. the right-side master cylinder to the brake mechanism for the right-side wheels and the left-side master cylinder to the brake mechanism for the left-side wheels). See e.g. FIGS. 3A-3C, 4B-4C, 5A-5B and 6A-6B.

As shown schematically in FIGS. 9A-9B (for the combined hydraulic system of FIGS. 5A-5B), the master cylinder/assembly MC comprises a housing 302 (containing hydraulic/brake fluid and coupled to remote reservoir and/or master cylinder) connected through an adapter 330 with O-ring 332 and fitting 334 at port/inlet 302b (to remote reservoir and/or master cylinder through hose HS) and to a port/outlet 302c (through a hose to a corresponding brake mechanism); a piston assembly PA within the housing 302 (at port/inlet 302f comprises a piston P/306 with a piston spring SG/303 and a seal shown as cup seal 304 at one end and a seal shown as O-ring seal 308 at one end; piston P/306 is actuated by a pushrod PR/310 with a retaining washer 312 and C-clip 314 with a grommet boot 316 retained by a pushrod nut 318. As shown schematically, the steer/brake system comprises a resilient element shown as steering emulator spring SR/340 retained on the pushrod PR/310 by a jam nut 320 with spring adjuster 322 and a spring nose perch 326. See also FIGS. 11A-11E, 12A-12B, 13 and 14A-14C (actuation of master cylinder MC of steer/brake system SS with emulator spring SR by steer control SC through steer plate SP). As shown schematically in FIGS. 2, 3A and 5A, the master cylinder assembly MC is mounted to a frame section FR and coupled by the pushrod PR/310 to a steer plate SP and shaft ST within post PT of handlebar H to provide the steer control SC of the operator control OC for the vehicle V. See also FIG. 13.

As shown schematically in FIGS. 4B-4C, 5A-5B, 11A-11E, 12A-12B, 13 and 14A-14C, actuation of the steering control SC at operator control OC from handlebar H/post PT with shaft ST will through the steer plate SP drive the spring nose perch 326 into the spring SR/340; spring SR/340 is driven into the spring adjuster 322 which drives pushrod PR/310 to deploy the piston P/306 into the housing 302 of the master cylinder assembly MC (e.g. to transmit hydraulic/brake fluid through the hose system HS to actuate the shared brake mechanism DC); as indicated schematically (in a tandem arrangement), each master cylinder assembly MC on one side of the frame is coupled to a corresponding brake mechanism (e.g. disc/caliper arrangement DC) for the wheels on one side of the vehicle. See e.g. FIGS. 3B, 4B-4C and 5A-5B.

Figure 10A:
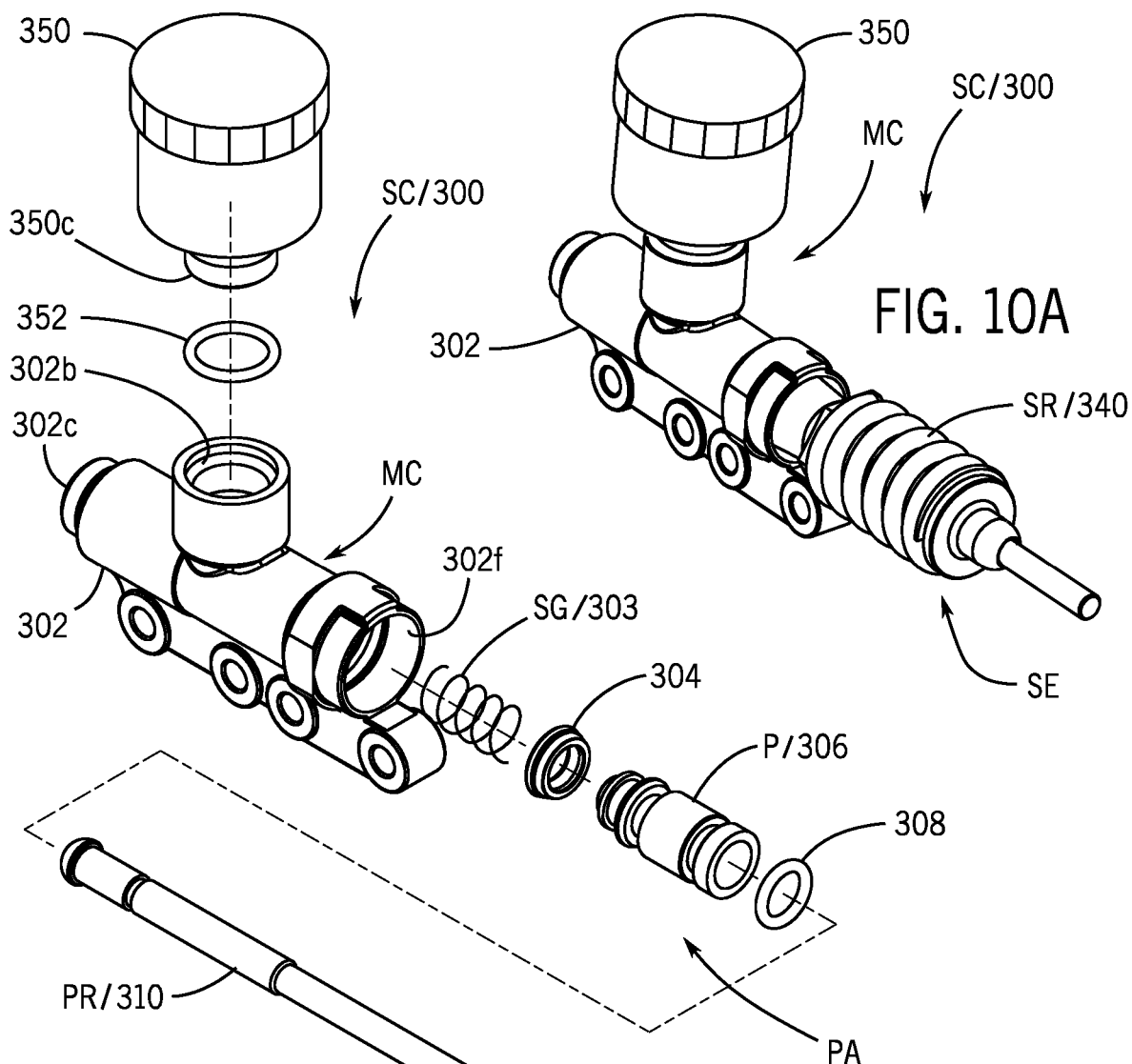
FIG. 10A is a schematic perspective view of a brake control for a steer control/system according to an exemplary embodiment.
Figure 10B:
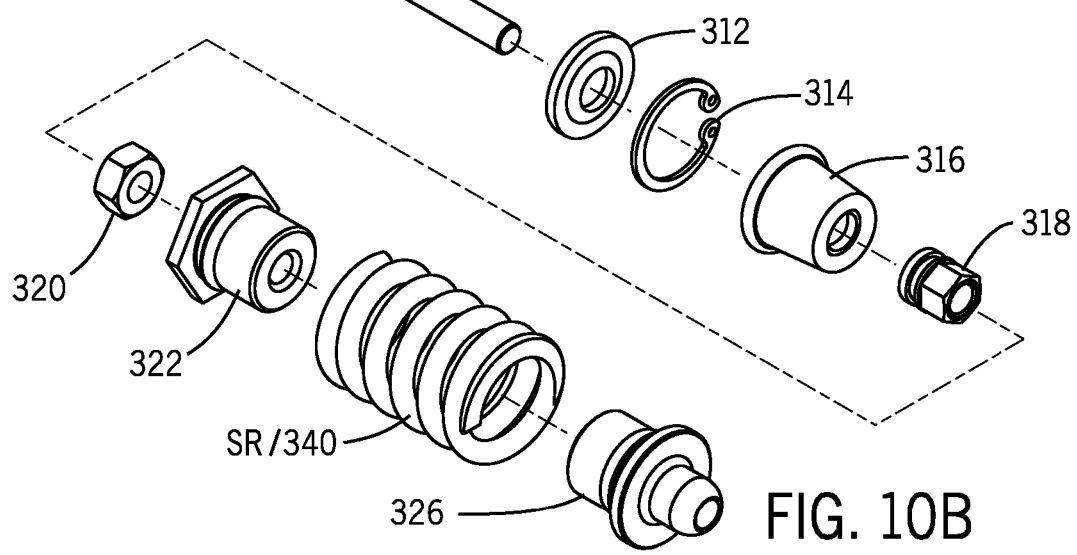
FIG. 10B is a schematic perspective exploded view of the steer control/system for the braking system according to an exemplary embodiment.

As shown schematically in FIGS. 10A-10B (for the separated hydraulic system of FIGS. 6A-6B), the master cylinder/assembly MC comprises a housing 302 coupled to a reservoir 350 (containing hydraulic/brake fluid) through a connection 350c with O-ring 352 (at port 302b) and with a port/outlet 302c (e.g. to a hose HS coupled to the corresponding brake mechanism); a piston assembly PA within the housing 302 (at port/inlet 302f comprises a piston P/306 with a piston spring 303 and a cup seal 304 at one end and O-ring seal 308 at one end; piston P/306 is actuated by pushrod PR/310 with a retaining washer 312 and C-clip 314 with a grommet boot 316 retained by a pushrod nut 318. As shown schematically, the steer/brake system comprises a resilient element shown as steering emulator spring SR/340 retained on the pushrod PR/310 by a jam nut 320 with spring adjuster 322 and a spring nose perch 326. See also FIGS. 11A-11E, 12A-12B, 13 and 14A-14C (actuation of master cylinder MC of steer/brake system SS with emulator spring SR by steer control SC through steer plate SP). As shown schematically in FIGS. 2, 3A and 6A, the master cylinder assembly MC is mounted to a frame section and coupled by the pushrod PR/310 to a steer plate SP by shaft ST in post PT to handlebar H to provide the steer control SC of the operator control OC for the vehicle V.

As shown schematically in FIGS. 4B-4C, 6A-6B, 11A-11E, 12A-12B, 13 and 14A-14C, actuation of the steering control SC at operator control OC from handlebar H/post PT/shaft ST will through the steer plate SP drive the spring nose perch 326 into the spring SR/340; spring SR/340 is driven into the spring adjuster 322 which drives pushrod PR/310 to deploy the piston P/306 into the housing 302 of the master cylinder assembly MC (e.g. to transmit hydraulic/brake fluid through the hose system HS to actuate the separate brake mechanism DCs); as indicated schematically (in a tandem arrangement), each master cylinder assembly MC on one side of the frame is coupled to a corresponding brake mechanism (e.g. disc/caliper arrangement DC) for the wheels on one side of the vehicle. See e.g. FIGS. 3A, 3C, 4B-4C and 6A-6B.

Referring to FIGS. 8A and 8B, the caliper assembly CP of the brake mechanism is shown schematically according to an exemplary embodiment. See also FIGS. 2, 3A, 5A and 6A (indicating brake mechanism with disc/caliper arrangement DC with caliper assembly CP is coupled to the hydraulic/brake system (by hose) and configured to provide braking action on a corresponding disc DS) in response to actuation from a control/master cylinder. As indicated schematically, the caliper assembly comprises a set of housings comprising caliper housing and mount-side housing secured by bridge bolts and provided with a bleeder screw (in housing); each housing contains a piston with a square seal and a wiper seal with crossover seals; brake pads (actuated by piston/transmission of brake fluid to engage the disc during braking action) are retained on a pad pin.

According to an exemplary embodiment as shown schematically in FIGS. 2, 3A-3C, 4B-4C, 5A-5B, 6A-6B, 9A-9B and 10A-10B, the steer/brake system may be configured with a steering emulation system (comprising the resilient element shown as emulator spring SR) to provide adjustable (e.g. tuned/tunable) emulation of steering action for the operator at the operator control notwithstanding that steering of the vehicle is implemented through a brake mechanism. Referring to FIGS. 11A-11E and 12A-12B, the steering emulation system SE of the steer/brake system is configured with the resilient element shown as spring SR between the steer control SC and the brake mechanism DC/DCs; as indicated schematically in FIGS. 11A-11E and 12A and 12B, the steering emulation system provides for a set of phases of steering emulation through the steer/brake system provided to be "felt" by the operator at the steer control during operation: (a) an initial phase (phase A) before engagement of the steering emulation system (see FIG. 11A); (b) an operating phase (phase B) with resilient/operating engagement of the steering emulation system (and indirect engagement of the master cylinder/piston) to provide a "feel" for the operator at the steer control (see FIGS. 11B-11D); (c) a completed phase (phase C) with completed engagement of the steering emulation system and direct engagement of the master cylinder/piston (see FIG. 11E).

Figure 11A:
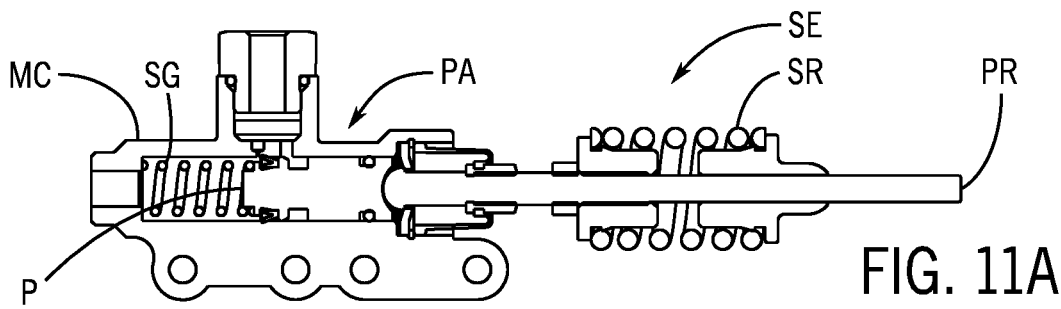
FIGS. 11A through 11E are schematic cross-section views of the operation of a steer/brake system with steering emulation system according to an exemplary embodiment.
Figure 11B:
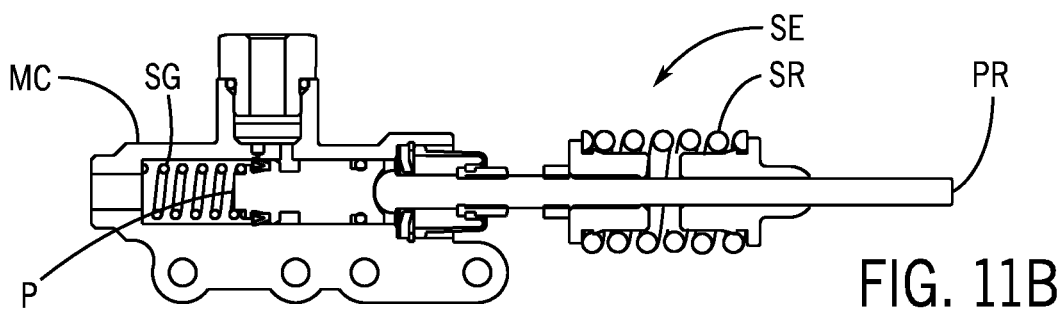
Figure 11C:
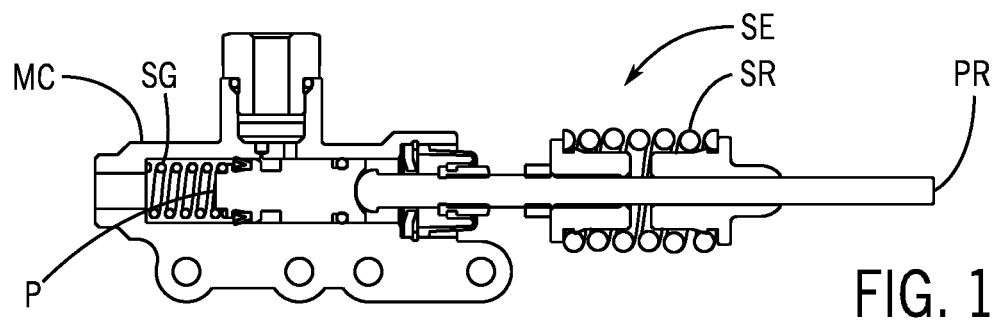
Figure 11D:
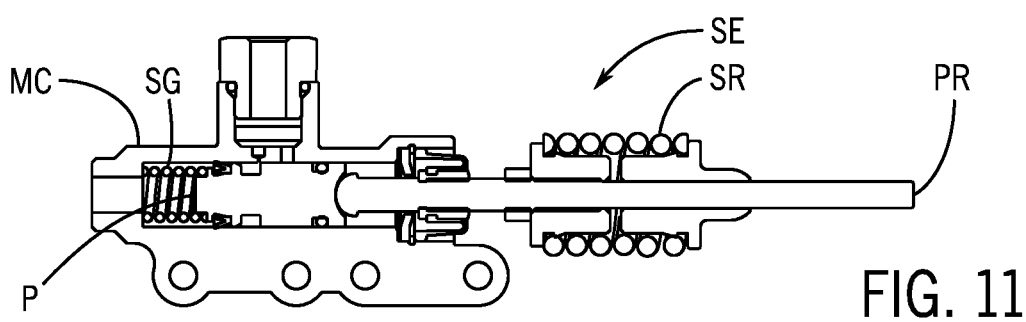
Figure 11E:
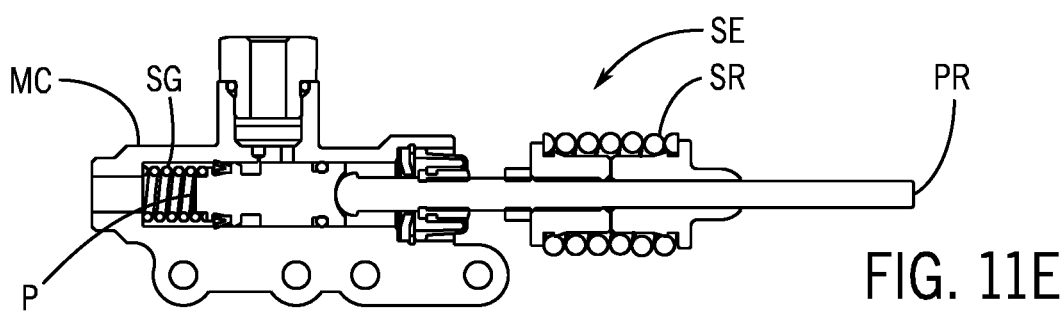
Figure 12A:
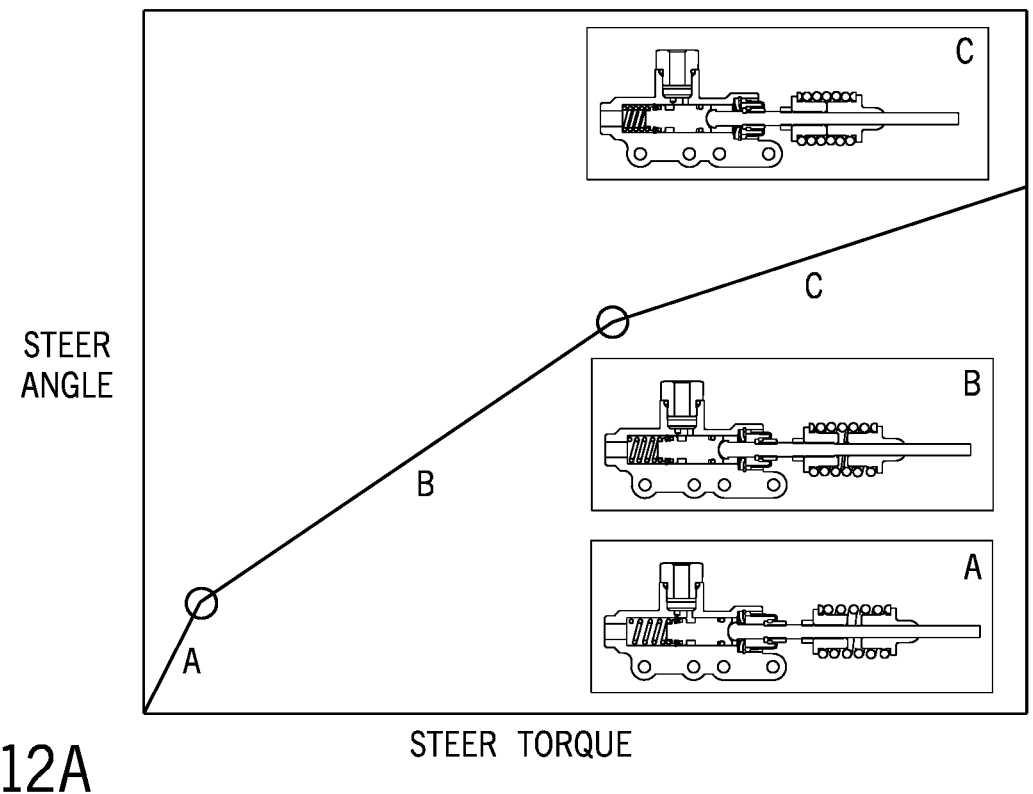
FIGS. 12A and 12B are schematic representations/graphs of the operation of a steer/brake system with steering emulation system according to an exemplary embodiment.
Figure 12B:
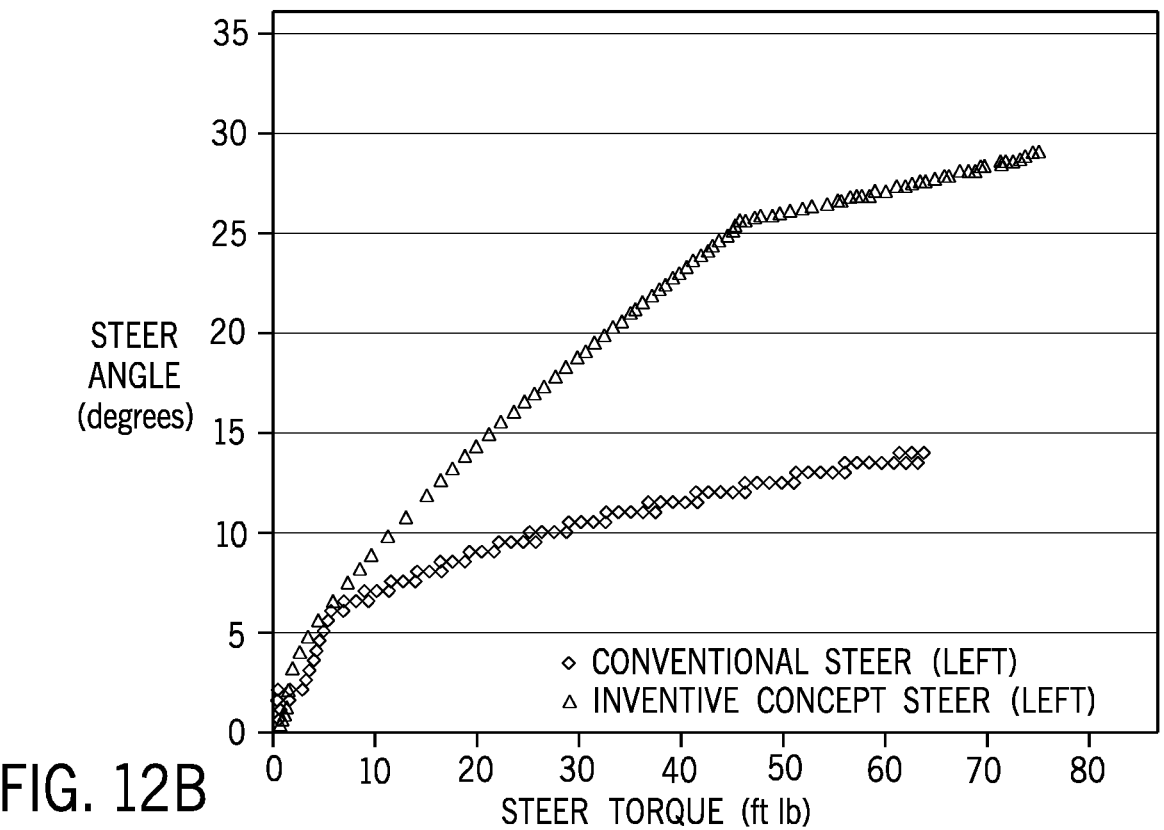
Figure 13:
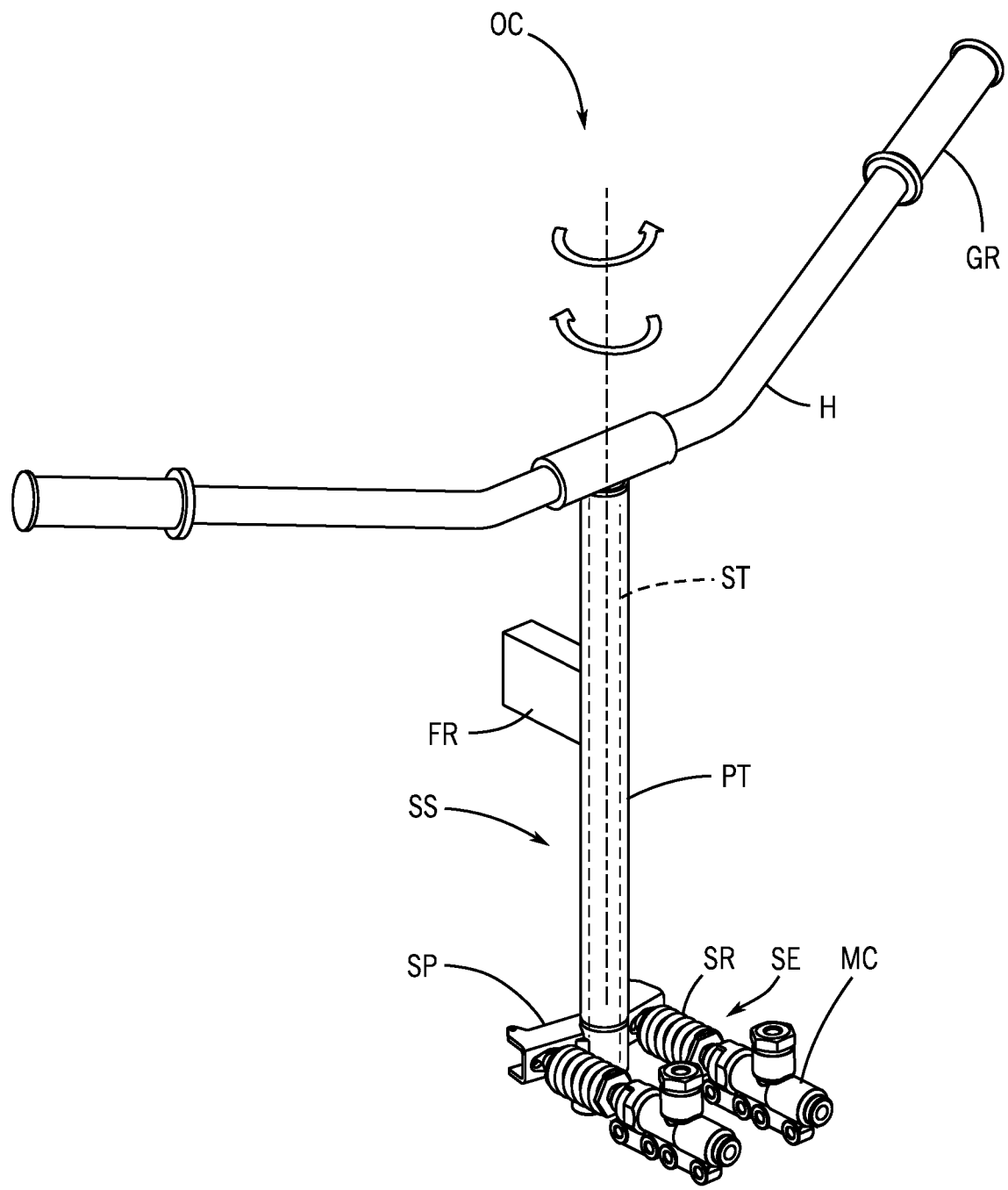
FIG. 13 is a schematic perspective view of an operator/steer control and steer/brake system according to an exemplary embodiment.
Figure 14A:
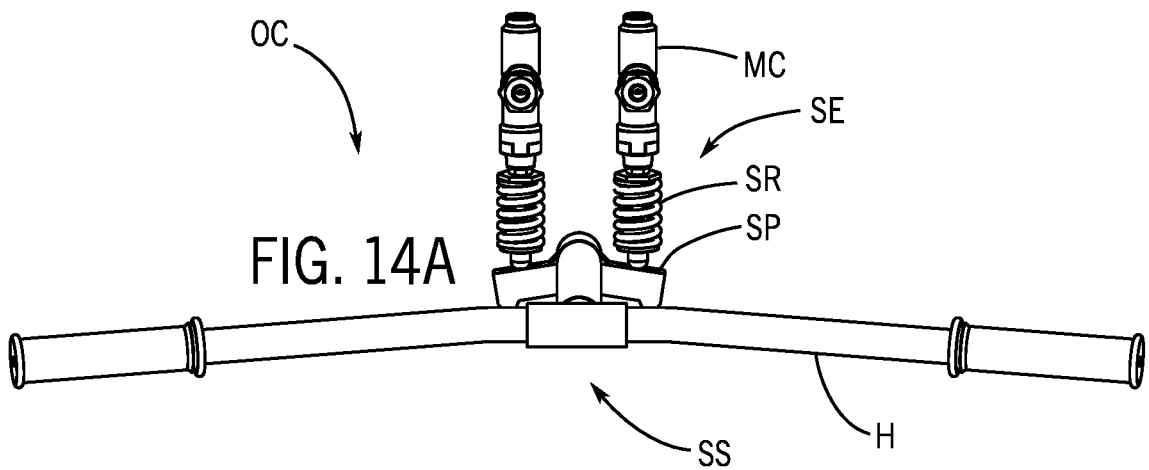
FIGS. 14A through 14C are schematic top views of an operator/steer control and steer/brake system according to an exemplary embodiment.
Figure 14B:
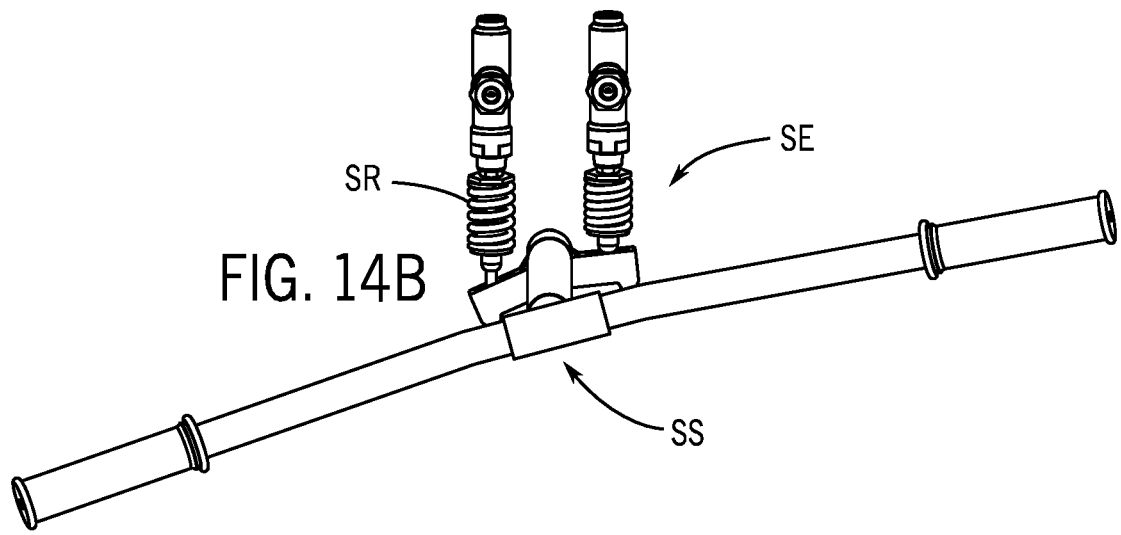
Figure 14C:
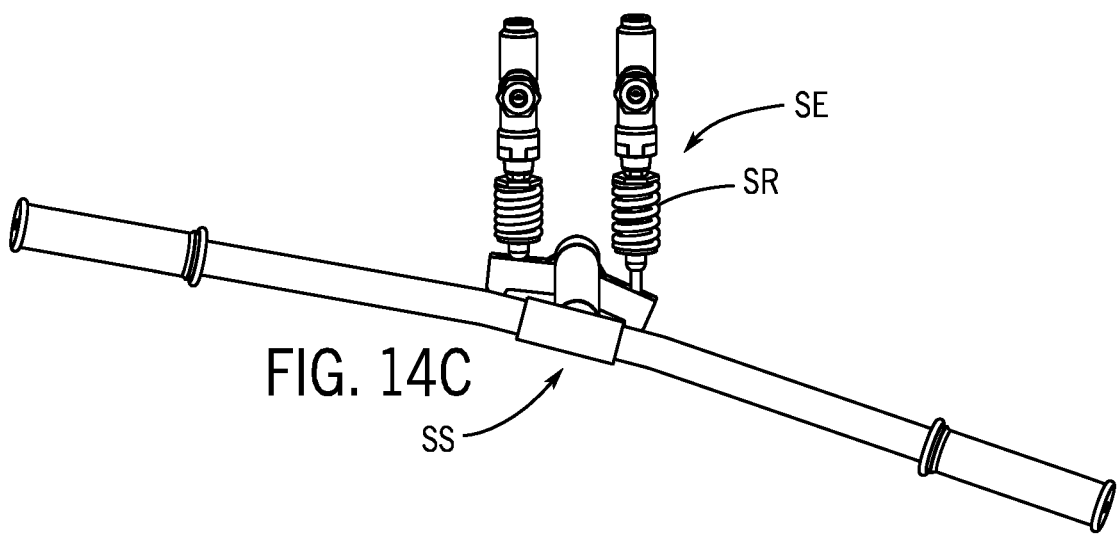

As indicated schematically/graphically in FIG. 12B, a conventional steering system for a steer/brake system does not provide for steering emulation/feel for the operator at the steer control; the steer/brake system with the steering emulation system (with inventive concept) provides a feel to the operator directly through the master cylinder/piston arrangement. See also FIG. 12A (with steering emulator system). Compare FIGS. 5A-5B and 6A-6B and 11A-11E. As indicated schematically in FIG. 12B, with the steering emulation system the "feel" provided to the operator by the steering emulation system can be "tuned" (e.g. by adjustment and/or design/configuration, selection of elements/spring element, balancing/compensation of elements/forces, steering/torque requirements, etc.) for a vehicle or application (e.g. use, preferences, operator information, etc.). See also FIGS. 9A-9B, 10A-10B, 13, 14A-14B, 15, 16 and 26A-26E.

As indicated schematically according to an exemplary embodiment in FIGS. 11A-11E, 12A, 13 and 14A-14C, during operator control of steering through steer control SC by turning the handlebar H (with grip GR operating on the wheels for one side of the vehicle through each master cylinder MC and corresponding brake mechanism DC/DCs) is implemented through the brake/steer system SS by action of the resilient element shown as emulation spring SR on pushrod PR into piston assembly PA of master cylinder MC in a sequence: (a) steering action is initiated at handlebar H as indicated in FIG. 11A but the master cylinder MC and spring SR are not engaged (during phase A indicated in FIG. 12A) with no emulation action initially felt by the operator; (b) steering action continues at handlebar H and the engagement of spring SR is initiated as indicated in FIG. 11B (at a transition from phase A to phase B indicated in FIG. 12A) with steering emulation about to be felt by the operator; (c) steering action continues at handlebar H as the spring SR is engaged as indicated in FIG. 11C and with master cylinder MC/piston P engaged to actuate steering action (during phase B indicated in FIG. 12A) with steering emulation felt by the operator; (d) steering action continues at handlebar H as the spring SR is compressed further as indicated in FIG. 11D with master cylinder MC/piston P engaged to actuate steering action (at a transition from phase B to phase C indicated in FIG. 12A) with steering emulation about to finish for the operator; (e) steering action continues at handlebar H as the spring SR is compressed (in full and/or travel stop) as indicated in FIG. 11E with master cylinder MC/piston P directly engaged to continue to actuate steering action (during phase C indicated in FIG. 12A) with no steering emulation felt by the operator. See also FIGS. 14B or 14C (indicating steering action in either direction operating one master cylinder/spring or the other master cylinder/spring of the steer/brake system through steer plate).

As indicated schematically according to an exemplary embodiment in FIGS. 12A and 12B, the steering emulation system may be configured to alter the "feel" of steering of the vehicle operator at the steer control by providing a steering emulation effect that is different (e.g. shown phase B of steering operation through an intermediate element shown as spring SR and decoupled/indirect with respect to the master cylinder/brake mechanism arrangement) than the effect that otherwise would be felt at the steer control from the master cylinder/brake mechanism arrangement (e.g. directly coupled) notwithstanding that steering control is actuated through the master cylinder/brake mechanism arrangement. See FIG. 12B (indicating schematically/representationally a variation of slope/position of steer angle as a function of steer torque with the inventive concept/steer emulation system in comparison with the conventional direct/system). As indicated schematically in FIGS. 3B-3C and 11A-11E, the steer system with interface/compliant element is configured to produce modulation (e.g. effect/feel provided by configuration, material, properties, size, etc. of the compliant element) at the operator control as indicated in FIGS. 12A and 12B. See also FIGS. 4B-4C, 13 and 14A-14C.

As shown according to an exemplary embodiment in FIGS. 13 and 14A-14C, the steer/brake system SS with the steering emulation system SE is actuated by turning action at the operator control OC through the handlebar H on post PT mounted to frame FR with steer post shaft ST with connection by the steer plate PT through the resilient element shown as spring SR to the pushrod/piston assembly of the master cylinder (and to the corresponding brake mechanism for the wheel/wheels on the corresponding side of the vehicle). See also FIGS. 4B-4C. As indicated schematically in FIGS. 11A-11E, 14A-14C, 15, 16 and 26A-26E, the performance/parameters of operation of the steering emulation system SE can be modified by configuration/adjustment and design variations (e.g. resilient element design/selection, force/spring force, travel distance, etc.).

As indicated schematically in FIGS. 5A-5B, 6A-6B, 13, 14A-14C, 15, 21A-21B, 23A-23B, 24, 25A-25B, the operator control for the steer/brake system may comprise a member such as a handlebar coupled by a member such as shaft ST (within post PT) to a member such as steer plate SP to actuate the brake mechanism from master cylinder (with piston assembly) through a member shown as pushrod PR; the steer/brake system may comprise the steer emulation system SE as indicated schematically to provide modulation for the operator control. See FIG. 12A/phase B.

Figures 15, 16:
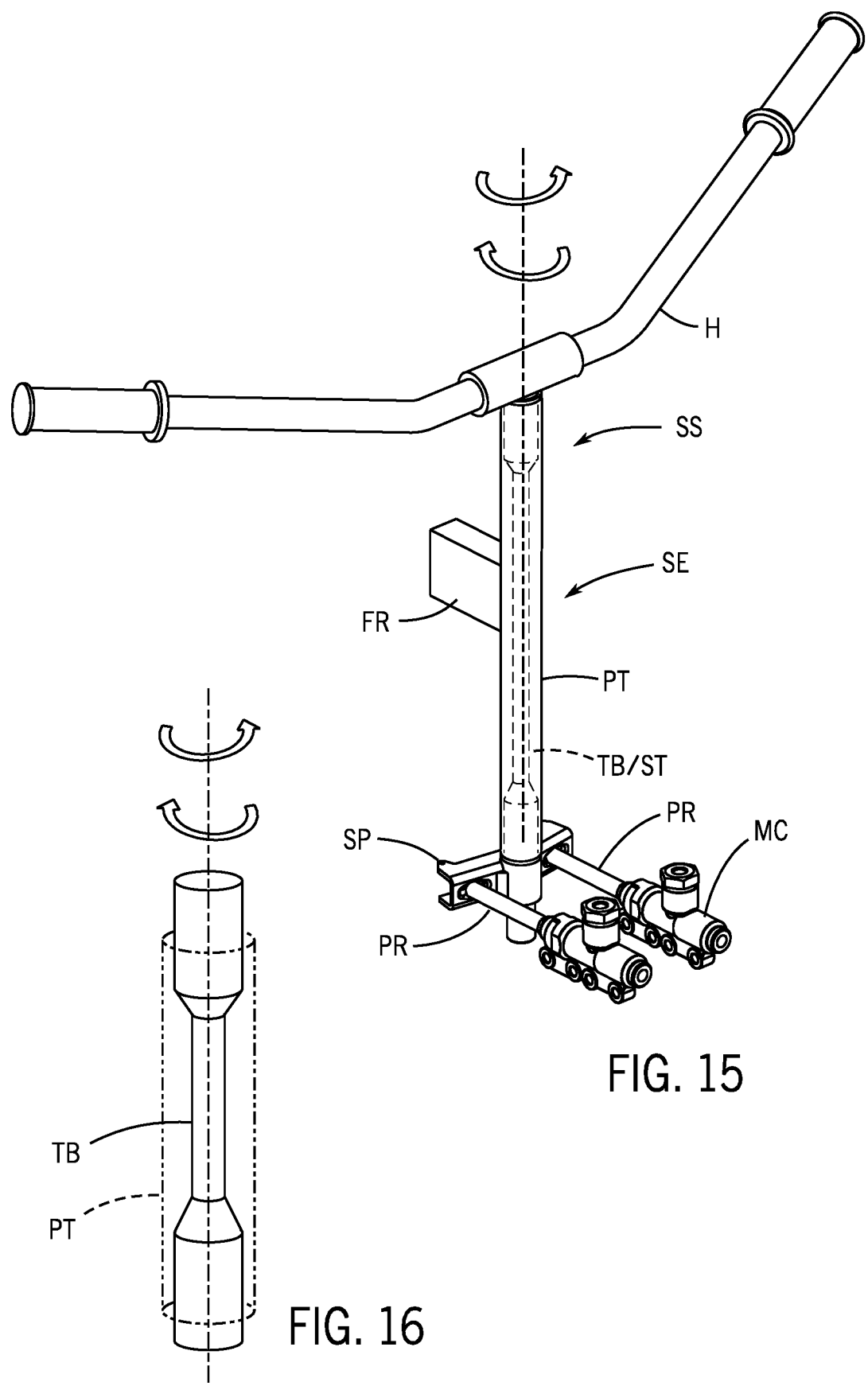
FIG. 15 is a schematic perspective view of an operator/steer control and steer/brake system according to an exemplary embodiment.
FIG. 16 is a schematic perspective view of a steering post/torsion bar for the steer/brake system according to an exemplary embodiment.

According to an exemplary embodiment as shown schematically in FIGS. 15 and 16, the steering emulation system SE may be implemented through a handlebar H/operator control with a steering system SS comprising steer post shaft ST shown as a resilient element such as a torsion bar TB (e.g. selected/tuned for strength, performance and torque/feel as intended in the application) actuated through/within post PT (mounted to frame FR) and coupled at steer plate SP though the pushrod for each master cylinder MC. As indicated schematically, other/alternative configurations of the steering emulation system may be provided for implementation with the steer/brake system to provide feel/performance such as shown in FIGS. 4B-4C, 12A-12B, 13 14A-14C.

Figure 21A:
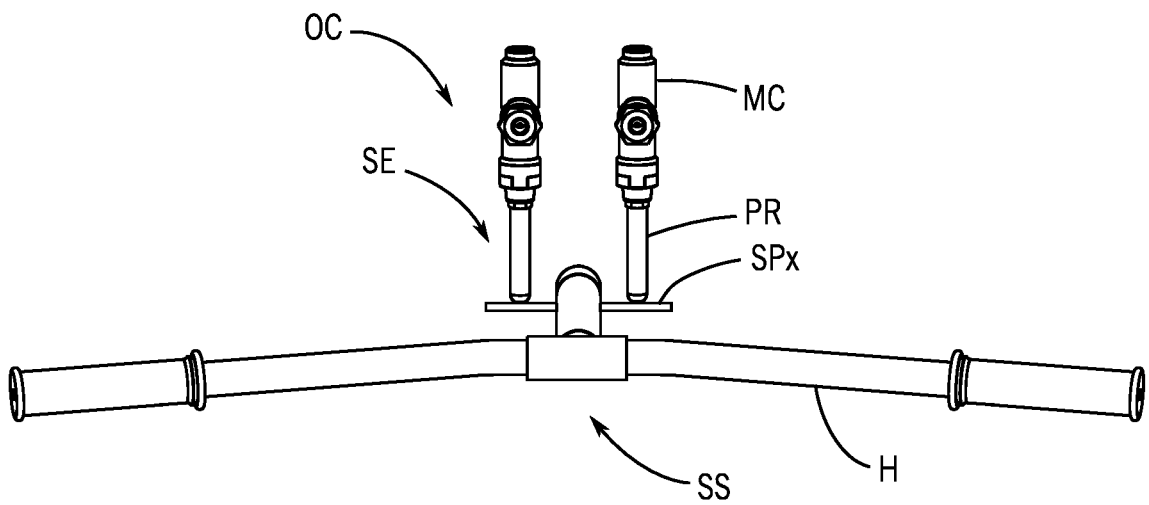
FIGS. 21A and 21B are schematic top views of an operator/steer control and steer/brake system according to an exemplary embodiment.
Figure 21B:
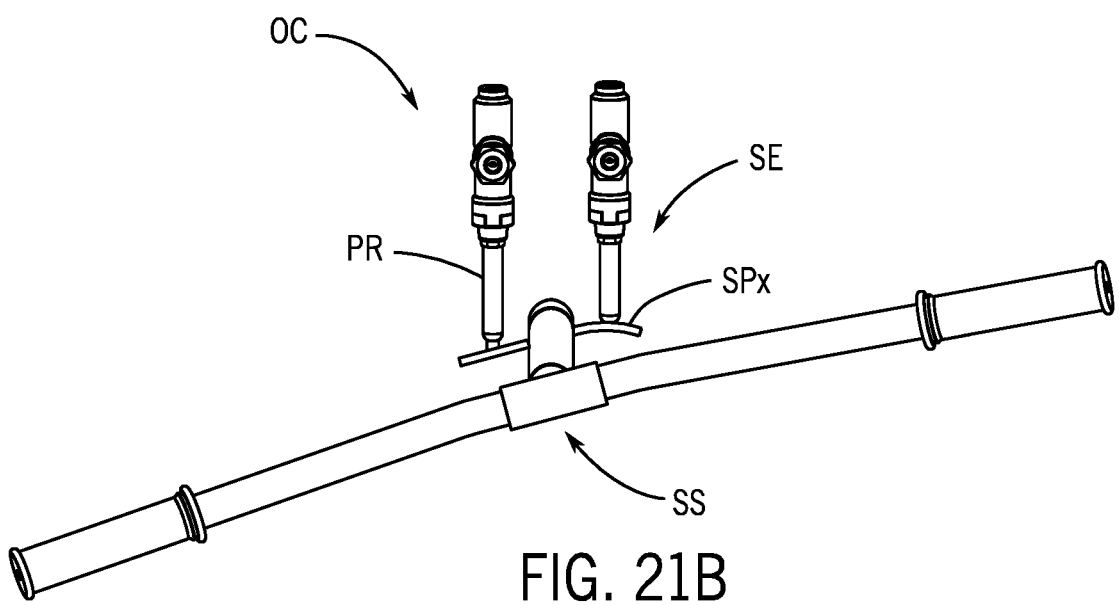
Figure 22:
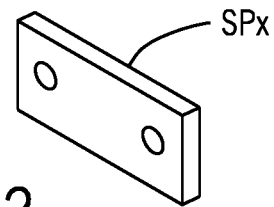
FIG. 22 is schematic perspective view of steer plate/member for a steer/brake system for a vehicle according to an exemplary embodiment.

According to an exemplary embodiment as shown schematically in FIGS. 21A-21B, the steering emulation system SE may be implemented for the operator control shown as handlebar H for the steering system SS comprising a steer plate SPx shown as a resilient element such as flexible plate (e.g. selected/tuned for strength, performance and torque/feel as intended in the application) actuated by a steer shaft such as shaft through/within post (mounted to frame) and coupled though a pushrod for each master cylinder MC; pivotal movement at operator control transmitted to the steer plate SPx of the emulation system SE will flex/bend the steer plate SPx to provide for steering of the vehicle and modulation at the operator control. See also FIG. 22.

Figure 23A:
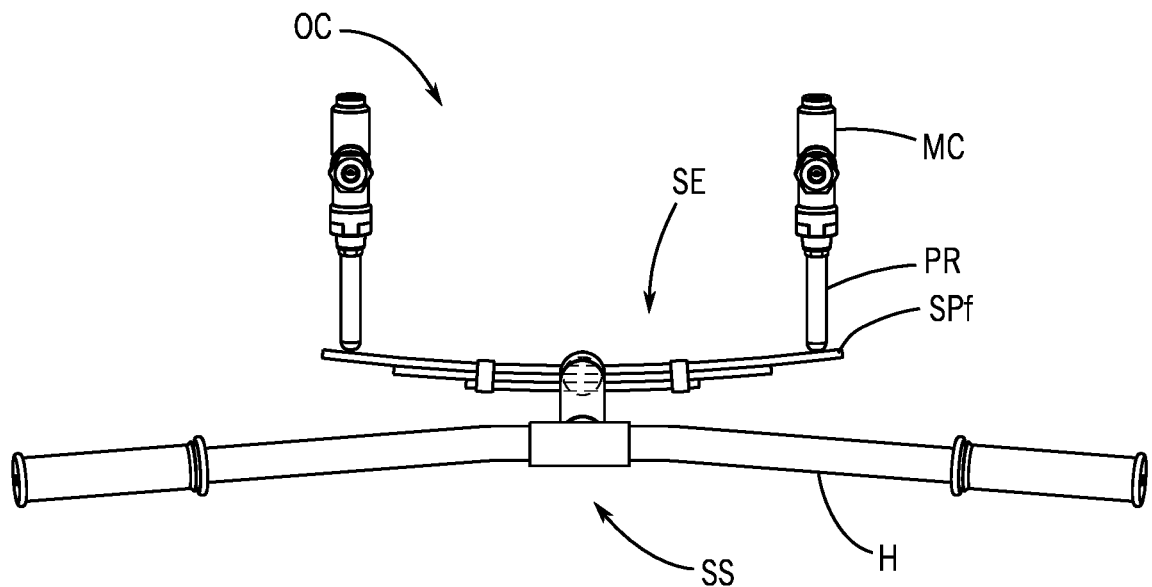
FIGS. 23A and 23B are schematic top views of an operator/steer control and steer/brake system according to an exemplary embodiment.
Figure 23B:
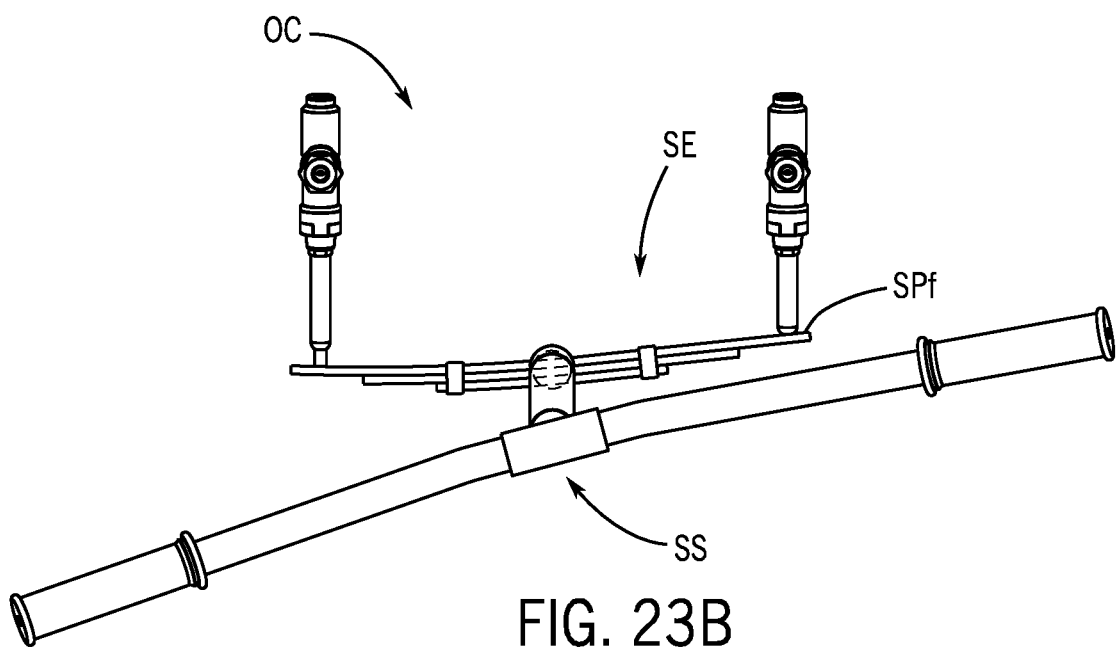

According to an exemplary embodiment as shown schematically in FIGS. 23A-23B, the steering emulation system SE may be implemented through an operator control shown as handlebar H for the steering system SS comprising a spring/steer plate arrangement shown as a resilient element such as leaf spring mechanism SPf (e.g. selected/tuned for strength, performance and torque/feel as intended in the application) actuated by a steer shaft such as shaft through/within post (mounted to frame) and coupled though a pushrod for each master cylinder MC; pivotal movement at operator control transmitted to the leaf spring mechanism SPf of the emulation system SE will flex/bend the leaf spring mechanism SPf to provide for steering of the vehicle and modulation at the operator control. See also FIG. 13 (schematic diagram of coupling of operator control/handlebar to steer plate through steer shaft within post).

Figure 24:
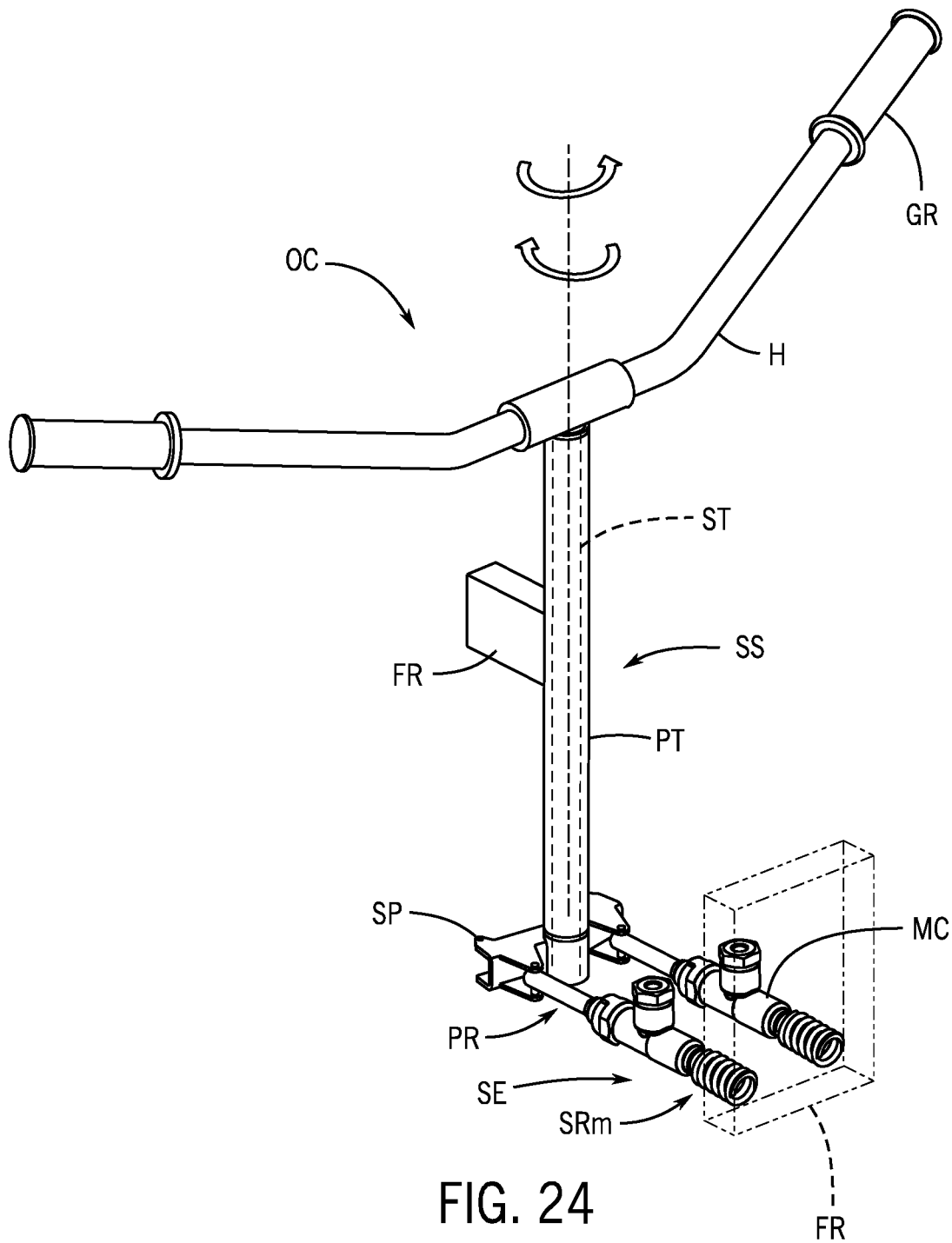
FIG. 24 is a schematic perspective view of an operator/steer control and steer/brake system according to an exemplary embodiment.

According to an exemplary embodiment as shown schematically in FIG. 24, the steering emulation system SE may be implemented through an operator control shown as handlebar H for the steering system SS comprising an external spring SRm (e.g. selected/tuned for strength, performance and torque/feel as intended in the application) actuated by a steer shaft such as shaft ST through/within post PT (mounted to frame) and coupled though a pushrod PR for each master cylinder MC; steering emulation system SE comprises the external spring SRm mounted to the frame FR; pivotal movement at operator control transmitted through the shaft ST and pushrod PR and master cylinder MC to the external spring mechanism SRm of the emulation system SE will retract/extend the external spring mechanism SRm to provide for steering of the vehicle and modulation at the operator control. See also FIGS. 12A-12B (schematic diagram of performance of emulation system).

Figure 25A:
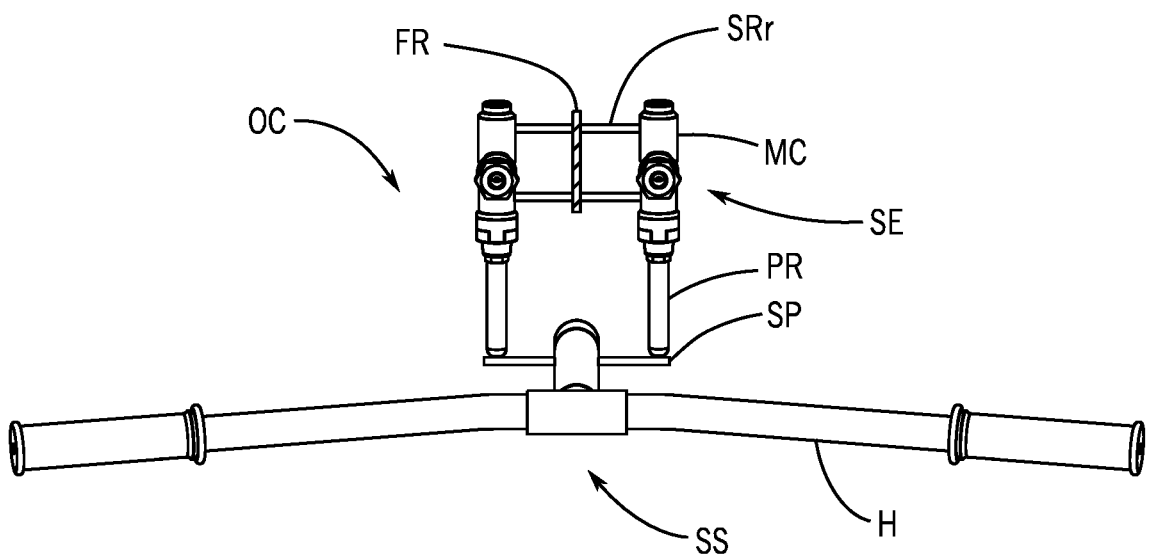
FIGS. 25A and 25B are schematic top views of an operator/steer control and steer/brake system according to an exemplary embodiment.
Figure 25B:
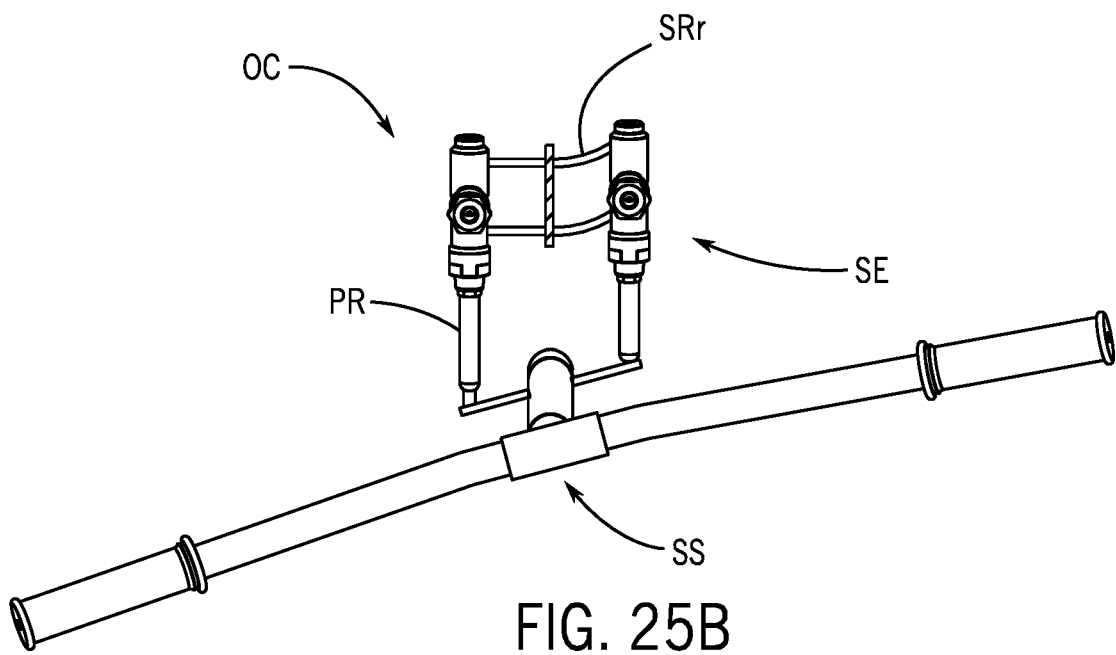
Figure 26A:
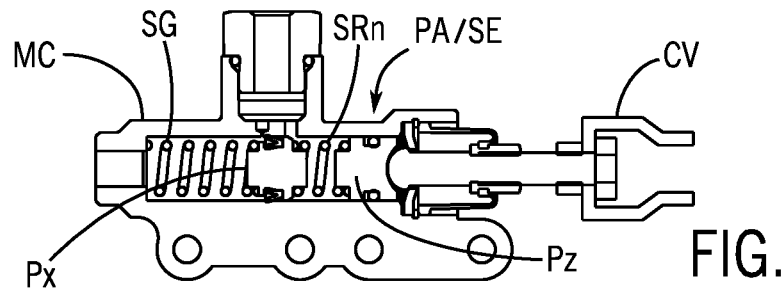
FIGS. 26A through 26E are schematic cross-section views of the operation of the steer/brake system with steering emulation system according to an exemplary embodiment.
Figure 26B:
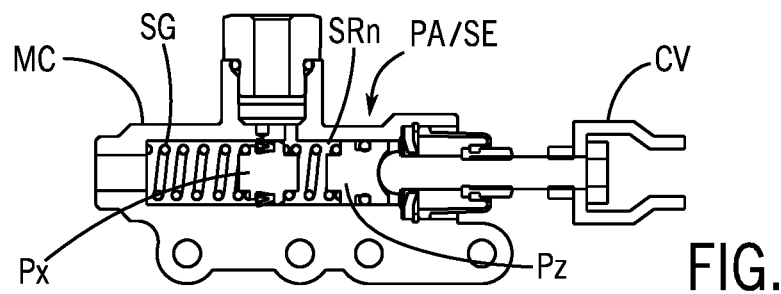
Figure 26C:
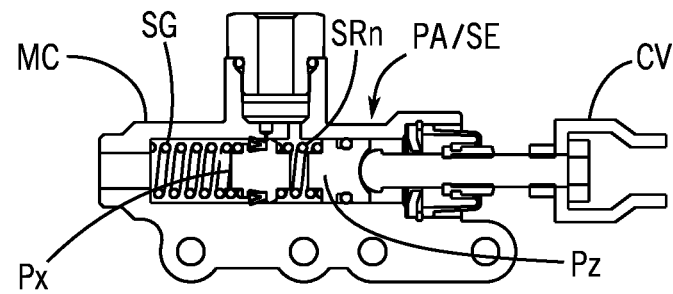
Figure 26D:
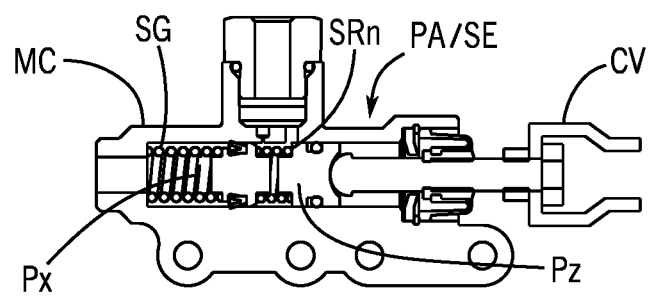
Figure 26E:
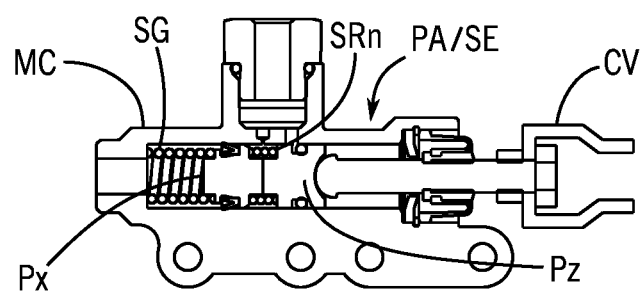
Figure 27:
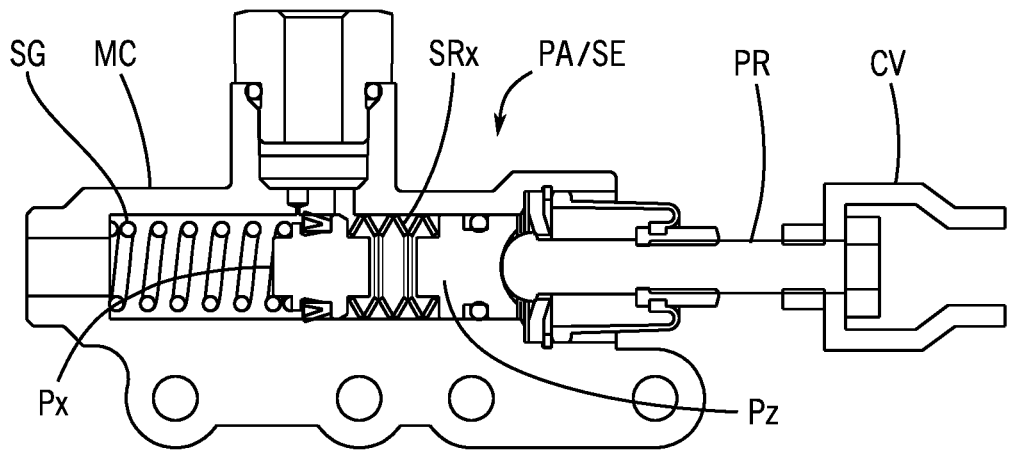
FIG. 27 is a schematic cross-section view a master cylinder arrangement for a steer/brake system with steering emulation system according to an exemplary embodiment.
Figure 28:
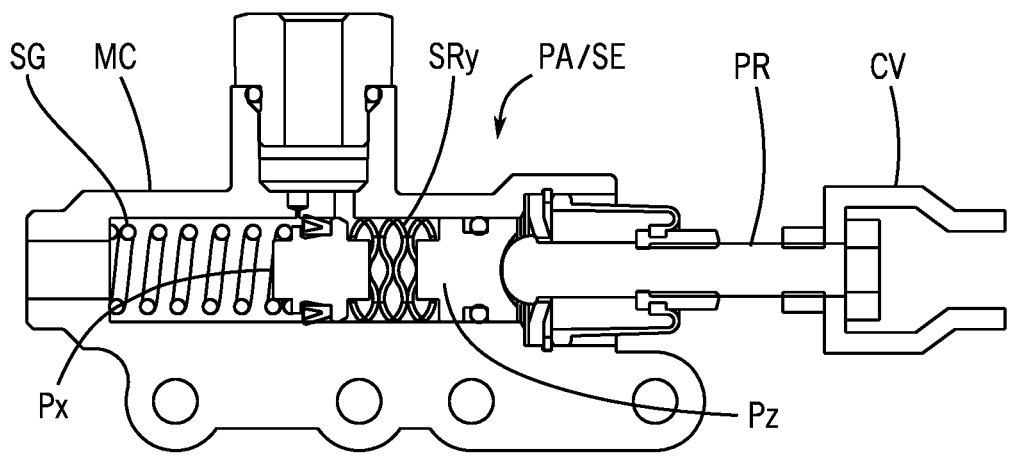
FIG. 28 is a schematic cross-section view a master cylinder arrangement for a steer/brake system with steering emulation system according to an exemplary embodiment.
Figure 29:
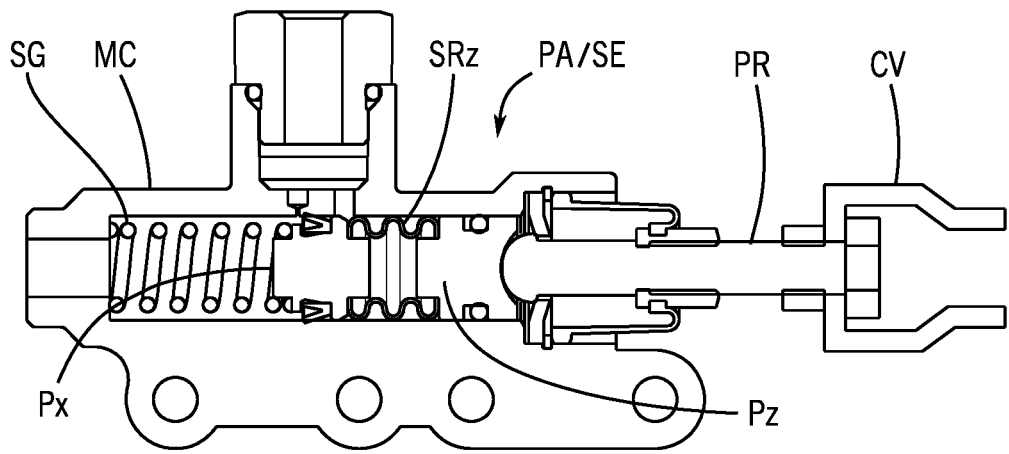
FIG. 29 is a schematic cross-section view a master cylinder arrangement for a steer/brake system with steering emulation system according to an exemplary embodiment.
Figure 30A:
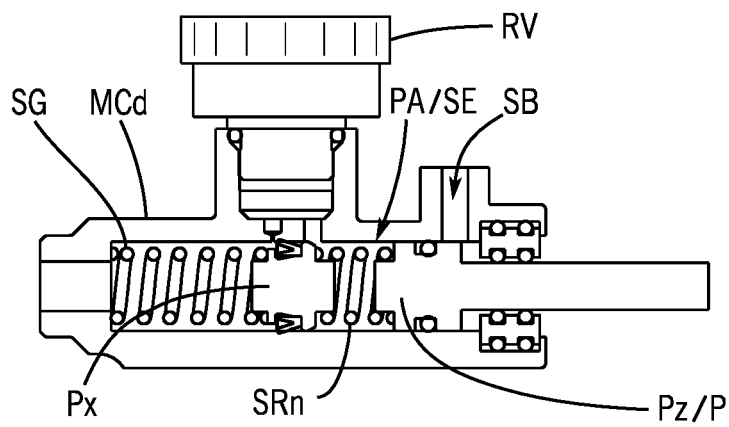
FIGS. 30A through 30D are schematic cross-section views of the operation of the steer/brake system with steering emulation system according to an exemplary embodiment.
Figure 30B:
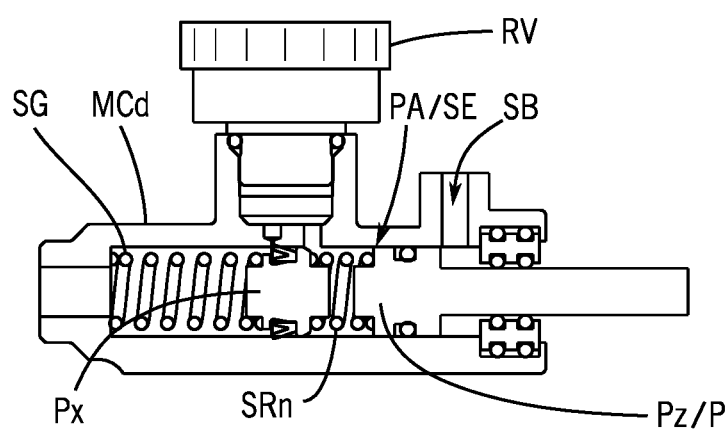
Figure 30C:
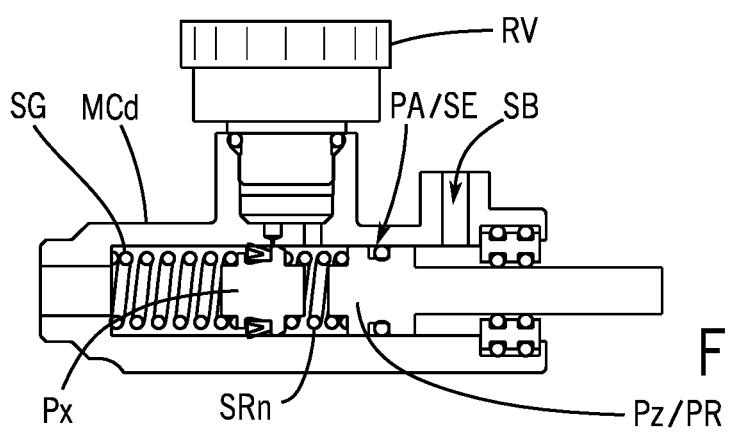
Figure 30D:
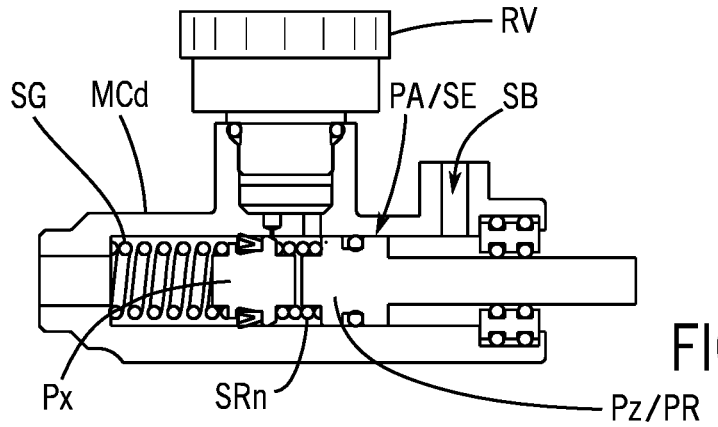

According to an exemplary embodiment as shown schematically in FIGS. 25A-25B, the steering emulation system SE may be implemented for the operator control shown as handlebar H for the steering system comprising a member shown as an elastomer web SRr (e.g. selected/tuned for strength, performance and torque/feel as intended in the application) coupled to the frame FR and to each master cylinder MC and actuated by a steer shaft such as shaft through/within post (mounted to frame) and coupled though a pushrod for each master cylinder MC; pivotal movement at operator control transmitted to the elastomeric web SRr of the emulation system SE will flex/bend the elastomeric web SRr to provide for steering of the vehicle and modulation at the operator control.

Figure 18A:
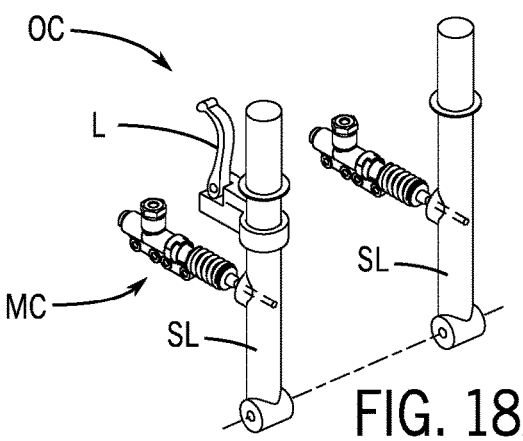
FIGS. 18A and 18B are schematic perspective views of a steer/brake system for a vehicle according to an exemplary embodiment.
Figure 18B:
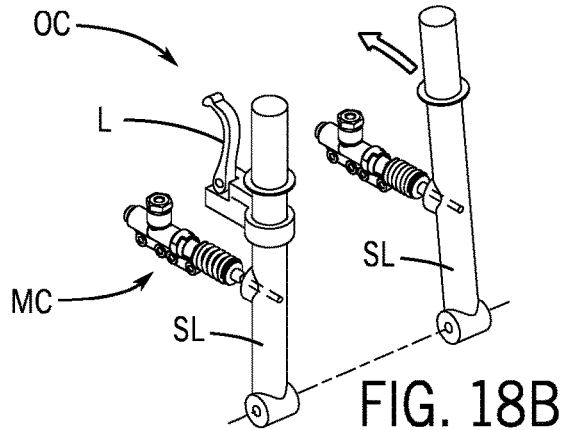
Figure 20A:
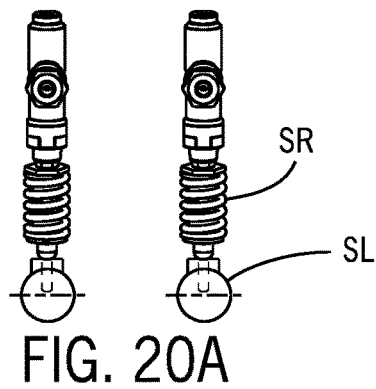
FIGS. 20A through 20C are schematic diagrams of actuation of braking/steering operation for a vehicle according to an exemplary embodiment.
Figure 20B:
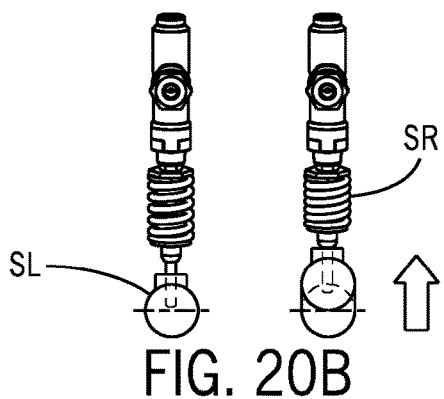
Figure 20C:
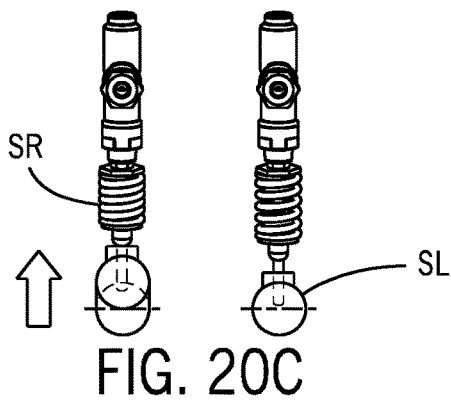
Figure 19:
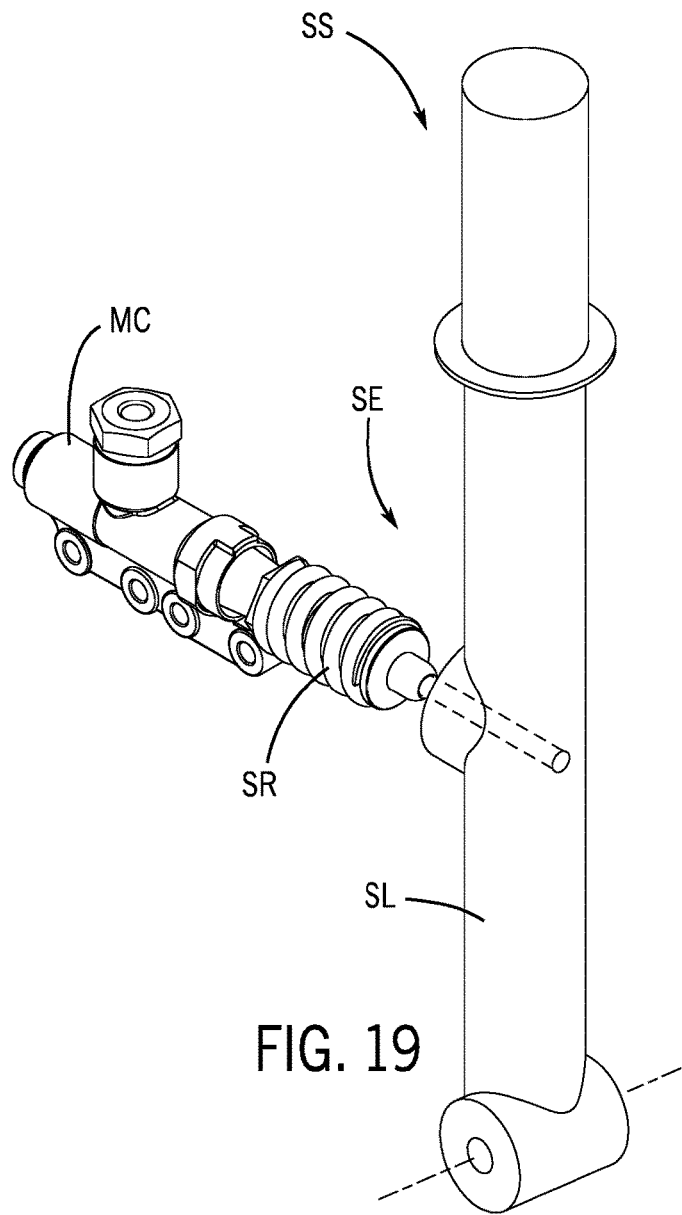
FIG. 19 is schematic perspective view of steer lever for a steer/brake system for a vehicle according to an exemplary embodiment.

As shown in FIGS. 18A-18B, 19 and 20A-20C, the steer/brake system may comprise an operator control OC shown as a set of steer levers SL (with brake lever L) on a pivot axis to provide the interface with steer emulation system SE (with spring SR configured to compress/extend) operated through master cylinder MC and coupled to the brake mechanism; as indicated schematically in FIGS. 18B and 20B-20C, push-pull/pivotal movement of a steer lever SL will actuate the steer/brake system with spring SR/emulation system SE and provide for steering of the vehicle and modulation at the operator control. See also FIGS. 17A-17C (stopping and braking/turning operation of steer/brake system with operator control).

As shown schematically according to an exemplary embodiment in FIGS. 26A-26E, the piston assembly PA (with interface shown as compliant element arrangement SE) may comprise a compliant element/interface shown as spring SR separating two piston elements (shown as opposing piston segments Px and Pz); actuation of the steering control at operator control OC from handlebar H/post PT will through a clevis arrangement CV drive the pushrod to deploy piston element Pz into the spring SR; the spring SR will be engaged and as compressed will engage and move the opposing piston element Px into the housing of the master cylinder assembly MC (e.g. to transmit hydraulic/brake fluid through the hose system to actuate the brake mechanism). As indicated schematically in FIGS. 3B-3C and 26A-26E, the piston assembly/compliant element arrangement PA/SE (e.g. with compliant element/interface) may be configured to produce modulation (e.g. effect/feel. etc.) from the steer system at the operator control as indicated in FIGS. 12A and 12B. See also FIGS. 3B-3C, 4B-4C, 13 and 14A-14C, 15 and 16. As indicated schematically in FIGS. 26A-26E, the compliant element of the system SE shown as spring SR is configured to be compressed (e.g. fully or to a travel stop) as the piston segments Px/Pz are moved within the chamber of the piston assembly PA of the master cylinder assembly MC (e.g. against compliant element/spring SE/SR with continued input at the operator control); the piston spring will be partially compressed and then can be fully compressed between piston segments Px/Pz (e.g. the piston spring can be compressed further/fully with continued actuation at the operator control). Compare FIGS. 11A-11E and 12A-12B.

As shown schematically according to an exemplary embodiment in FIGS. 30A-30D and 32A-32B, the steer/brake system may comprise a combined hydraulic system with a hose system HS to actuate a single brake mechanism (e.g. a single disc/caliper arrangement DC for steer system and brake system) for wheels on each side of the vehicle; as shown schematically, the braking system comprises a shared hydraulic system with a dual-input master cylinder MCd comprising a piston Px on piston spring SG; the dual-input master cylinder MCd comprises piston Pz on spring SRn and pushrod PR (with a seal); the dual-input master cylinder MCd comprises a coupling SB through hose HS to the operator control and a reservoir RV for hydraulic fluid; the dual-input master cylinder MCd is configured to supply hydraulic fluid to actuate the steering brake mechanism and the service brake mechanism as indicated schematically in FIGS. 30A-30D (showing progressive actuation at pushrod PR compressing spring SRn and spring SG to actuate piston Pz and piston Px to modulate hydraulic actuation of the brake/steer system). See also FIGS. 3A, 31 and 32A-32B. As indicated schematically in FIGS. 32A and 32B, the operator control at the handlebar for the brake system comprises a brake control BC with a lever to actuate through a master cylinder MCd coupled through the hose system HS to the brake mechanism comprising the disc/caliper arrangement DC (with caliper CP coupled to the hose system HS and disc DS); the brake system BS is configured for coordinated slowing/stopping of the wheels on both sides of the vehicle (e.g. to facilitate braking). See also FIGS. 3A, 30A-30D and 31. As indicated schematically in FIGS. 1, 2, 3A and 32A-32B, the operator control OC at the handlebar for the steer/brake system SS may comprise a steering control SC actuated by rotation of a handlebar at a post (e.g. coupled through a steer plate) connected to a set of master cylinders MCd; each master cylinder MCd is coupled through the hose system to the brake mechanism comprising the disc/caliper arrangement DC (with caliper CP coupled to the hose system and disc DS); the steering system SS is configured for separate/relative slowing of the wheels on one side of the vehicle (e.g. to facilitate steering/turning).

As shown schematically in FIGS. 30A-30D and 32A-32B, the steer/brake system provides two hydraulic circuits for the dual-input master cylinder MCd which comprises a piston Px and spring SG and piston Pz and spring SRn: (1) a first circuit for the steer brake system/mechanism that uses hydraulic fluid from the reservoir RV and (2) a second circuit for the service brake system/mechanism that uses hydraulic fluid through port SB. As shown schematically, the first circuit is separated/sealed from the second circuit (e.g. at piston assembly PA by a seal on the piston Pz integrated with and/or coupled to pushrod PR); the first circuit comprises the steer emulation system SE with spring SRn; design/selection of spring SRn facilitates modulation for steer emulation system SE. As indicated schematically in FIGS. 30A-30D, fluid pressure applied from the brake control/lever within the second circuit is applied through port SB to piston Pz which applies a force through spring SRn to the piston Px which applies a fluid pressure within the first circuit (in a fixed fraction of apportionment of pressure) for braking of vehicle. As indicated schematically in FIGS. 30A-30D, force applied through the operator control to the pushrod PR of second circuit is transmitted through spring SRn to piston Px which creates fluid pressure in the first circuit for steering of the vehicle and modulation (of "feel") at operator control. (As indicated schematically, apportionment of input pressure to force is the product of the effective surface area of the exposed (annular) surface area of piston Pz.)

Figure 31:
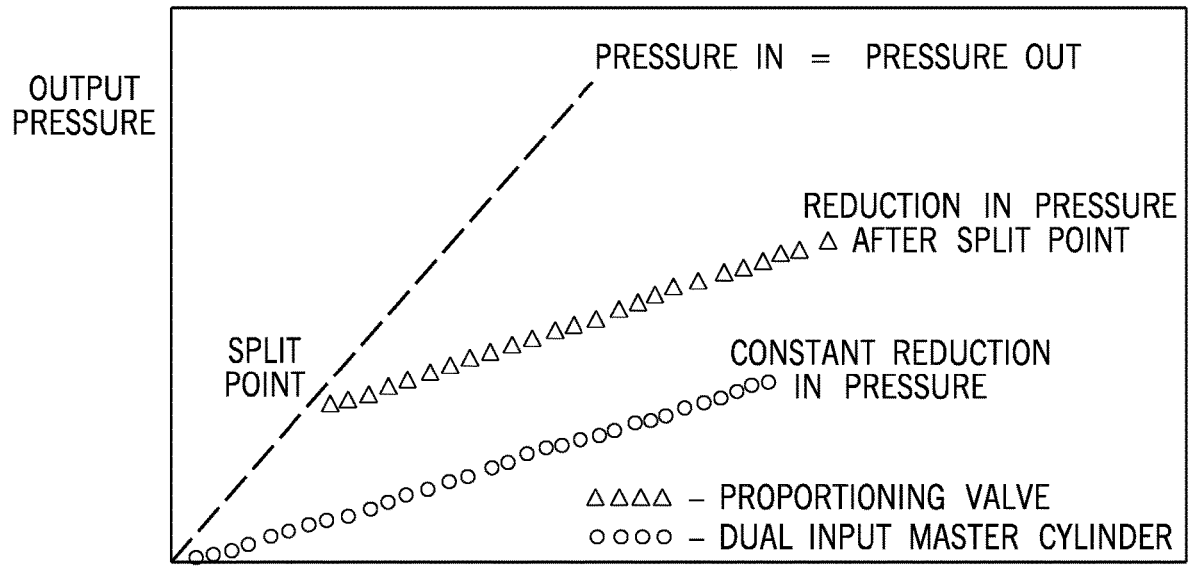
FIG. 31 is a schematic representation/graph of the operation of a steer/brake system with steering emulation system according to an exemplary embodiment.
Figure 32A:
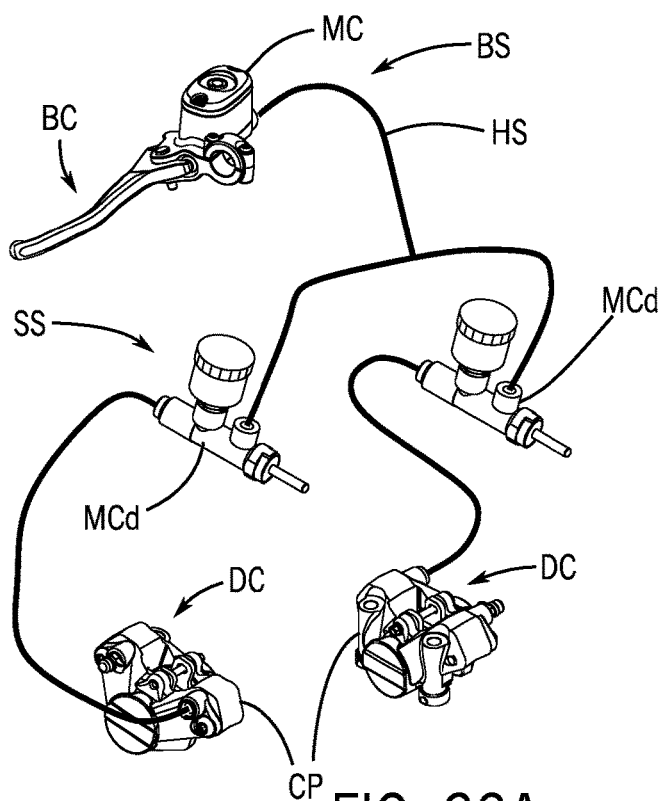
FIG. 32A is a schematic perspective view of a steer/brake system for a vehicle according to an exemplary embodiment.
Figure 32B:
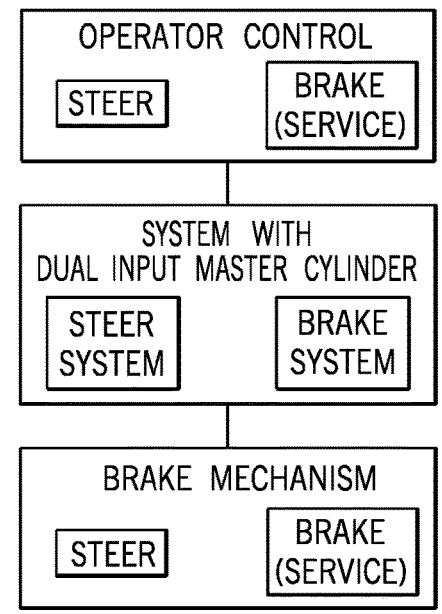
FIG. 32B is a system block diagram of a braking system for a vehicle according to an exemplary embodiment.

As indicated schematically in FIG. 31, input-output pressure/performance of a shared hydraulic system with a proportioning valve PV (see FIG. 3B) or with a dual-input master cylinder MCd is shown schematically according to an exemplary embodiment. Compare also FIGS. 5A-5B and 32A. As indicated schematically in FIG. 31, the setting of the split point of the proportioning valve for the steer system and brake system will regulate the reduction in pressure within the shared hydraulic system (e.g. pressure regulation for actuation of the service brake system). See also FIGS. 3B and 5A-5B. As indicated schematically in FIG. 31, the dual-input master cylinder for the steer system and brake system will facilitate operation by (in effect) constant apportioned reduction in pressure within the shared hydraulic system (e.g. pressure regulation for actuation of the service brake system). See also FIGS. 30A-30D and 32A-32B.

As indicated schematically in FIGS. 26A-26E, 27, 28 and 29, the steer/brake system providing the interface/steer emulation arrangement SE may be configured to comprise any of a wide variety of components. As indicated schematically according to an exemplary embodiment, the system providing the interface/steer emulation arrangement SE may comprise a master cylinder MC with a piston assembly PA actuated by pushrod PR (shown as coupled to a clevis arrangement CV); the master cylinder/piston assembly may comprise a piston Px on piston spring SG and an internal spring component/element shown as a coil spring SRn (see FIGS. 26A-26E) or as a Belleville/cone spring SRx (see FIG. 27) or as a wave spring SRy (see FIG. 28) or as an elastomeric component shown as rubber/elastomer spring element SRz (see FIG. 29) or any other suitable spring/resilient component; each spring/resilient component may be designed/configured (e.g. spring force as selected, designed, tuned, fit, configured to travel, etc.) to provide for intended operation of the steer/brake system in a vehicle. See also FIG. 1-2, 3A and 12A-12B (e.g. effect of steer/brake operation/emulation for operator at operator control through an interface).

As shown schematically according to an exemplary embodiment in FIGS. 12A-12B, the interface may be configured (e.g. as a steering emulation system, etc.) to provide for operation of the braking system for steering under operator control in (1) a first phase where the interface may be engaged before the master cylinder has engaged the caliper and disc of the brake mechanism (see FIG. 12A/phase A); (2) a second phase where the interface may be at least partially engaged and force may be applied through the interface to the master cylinder to engage the caliper with the disc of the brake mechanism to provide modulation for the operator control (see FIG. 12A/phase B); (3) a third phase where the interface may be fully engaged (e.g. to full compression and/or a travel stop) and force may be applied directly to the master cylinder to engage the caliper with the disc of the brake mechanism (see FIG. 12A/phase C). See also FIGS. 11A-11E and 26A-26E. Compare FIGS. 30A-30D and 31. As indicated schematically in FIGS. 5A-5B, 6A-6B, 13, 14A-14C, 15, 21A-21B, 23A-23B, 24, 25A-25B, the operator control for the steer/brake system may comprise a member such as a handlebar coupled by a member such as shaft ST (within post PT) to a member such as steer plate SP to actuate the brake mechanism from master cylinder (with piston assembly) through a member shown as pushrod PR; the steer/brake system may comprise the steer emulation system SE as indicated schematically to provide modulation for the operator control. See FIG. 12A/phase B.

As shown schematically according to an exemplary embodiment as indicated in FIGS. 4A-4C, 12A-12B and 17A-17C, the interface providing steering emulation SE for the steer/brake system for the vehicle may comprise a compliant element configured to provide modulation for the operator control OC. See e.g. FIGS. 3A-3C, 5A-5B, 6A-6B, 11A-11E, 13, 14A-14C, 15, 18A-18B, 21A-21B, 23A-23B, 24, 25A-25B, 26A-26E, 27, 28 and 29. Compare FIGS. 30A-30D, 31 and 32A-32B. According to an exemplary embodiment, the steer/brake system will be configured to provide for steering and braking through the operator control and an interface providing for steer emulation with at least operation in a phase where the interface will be at least partially engaged and force may be applied through the interface to the brake mechanism (e.g. master cylinder to engage the caliper with the disc of the brake mechanism) to provide modulation at the operator control (e.g. as a "feel") for the operator (see FIG. 12A/phase B). See also FIGS. 4A-4C and 17A-17C.

According to an exemplary embodiment shown in FIGS. 5A-5B, 6A-6B, 13, 14A-14C, 18A-18B, 24, 26A-26E, 27,

28, 29 30A-30D and 32A, the steer/brake system can be operated in various phases including (1) a first phase where the interface is engaged before the master cylinder has engaged the caliper and disc of the brake mechanism; (2) a second phase where the interface is at least partially engaged and force is applied through the interface to the master cylinder to engage the caliper with the disc of the brake mechanism to provide modulation for the operator control; (3) a third phase where the interface is fully engaged and force is applied directly to the master cylinder to engage the caliper with the disc of the brake mechanism. See also FIGS. 11A-11E and 12A-12B. According to an exemplary embodiment shown in FIGS. 15, 21A-21B, 23A-23B and 25A-25B, the steer/brake system can be operated in various phases including (1) a first phase where the interface is engaged before the master cylinder has engaged the caliper and disc of the brake mechanism; (2) a second phase where the interface is at least partially engaged and force is applied through the interface to the master cylinder to engage the caliper with the disc of the brake mechanism to provide modulation for the operator control with or without (3) a third phase where the interface is fully engaged and force is applied directly to the master cylinder to engage the caliper with the disc of the brake mechanism See also FIGS. 12A-12B. As indicated schematically, the steer/brake system may be configured to operate with only the first phase and the second phase (e.g. which phase may be provided in a continuous manner, in multiple segments/sub-phases, along a line, along a performance curve, etc. to provide modulation per the design specification/intent and/or until full travel). As indicated schematically, transition to the third phase of operation may be provided by a mechanical stop, etc. (A conventional system may provide only the first phase and the third phase of operation.)

Exemplary Embodiments—A

According to an exemplary embodiment as shown schematically, a steering system for a vehicle having wheels configured to be steered under control of an operator by slowing at least one wheel on one side of the vehicle relative at least one wheel on another side of the vehicle may comprise an operator control and a braking system for each side of the vehicle comprising a master cylinder to operate a brake mechanism comprising a caliper and disc for braking a wheel under operation of the operator control and an interface comprising a compliant element between the braking system and the operator control. See FIGS. 2, 3A-3C, 5A-5B, 6A-6B, 9A-9B, 10A-10B, 11A-11E, 12A-12B, 13, 14A-14C, 15, 16 and 26A-26E. As shown schematically, the interface may be configured (e.g. as steering emulation system, etc.) to provide for operation of the braking system for steering under operator control in (1) a first phase where the interface may be engaged before the master cylinder has engaged the caliper and disc of the brake mechanism (see FIGS. 11A-11B and 12A/phase A); (2) a second phase where the interface may be at least partially engaged and force may be applied through the interface to the master cylinder to engage the caliper with the disc of the brake mechanism to provide modulation for the operator control (see FIGS. 11C-11D and 12A/phase B); (3) a third phase where the interface may be fully engaged and force may be applied directly to the master cylinder to engage the caliper with the disc of the brake mechanism (see FIGS. 11E and 12A/phase C). See also FIGS. 12A-12B. The interface may comprise a compliant element configured to provide modulation for the operator control. See e.g. FIGS. 3A and 15.

As shown schematically, the braking system may facilitate steering of the vehicle through the operator control and interface by braking of at least one wheel on one side of the vehicle by the braking mechanism through the interface. See FIGS. 3A-3C, 4B-4C, 13 and 14A-14C. The compliant element may comprise a spring; modulation may be provided by the stiffness of the spring. See FIGS. 11A-11E, 12A-12B, 15, 16 and 26A-26E. Modulation may be provided by the hydraulic stiffness of the braking system. See FIGS. 12A-12B.

As shown schematically, in the first phase the spring may be uncompressed; the first phase may comprise a dead stroke of the braking system; in the first phase there may be no modulation (e.g. modulation is not initiated until the interface of the steer system is engaged) for the operator control of the braking system. See FIGS. 11A and 12A. The interface may be engaged in a transition from the first phase to the second phase. See FIGS. 11B and 12A. In the second phase the spring may be at least partially compressed. See FIGS. 11C and 12A. The interface may be disengaged at a transition from the second phase to the third phase. See FIGS. 11D and 12A. In the third phase the spring may be compressed (e.g. fully or at a travel stop); in the third phase the function of the braking system may be a function of the hydraulic stiffness of the braking system; in the third phase there may be no modulation (e.g. no further modulation from the interface of the steer system once fully engaged) for the operator control of the braking system; in the third phase the spring may be in contact with a spring perch. See FIGS. 11E and 12A.

As shown schematically, the operator control may comprise a rotatable control; the operator control may comprise a handlebar. See FIGS. 1-2, 3A, 4A-4C, 13 and 14A-14C. The brake mechanism may comprise a steering brake mechanism; and the braking system may comprise a service brake mechanism for slowing and stopping the vehicle. See FIGS. 3A-3B, 5A-5B and 6A-6B. The braking system may comprise a shared hydraulic system for operation of the steering brake mechanism and the service brake mechanism. See FIGS. 3B and 5A-5B. The brake mechanism may comprise the steering brake mechanism and the service brake mechanism. The braking system may comprise a separate hydraulic system for operation of the steering brake mechanism and the service brake mechanism. See FIGS. 3C and 6A-6B. The interface may be configured to engage a first master cylinder for a first set of wheels to steer the vehicle in a first direction and a second master cylinder for a second set of wheels to steer the vehicle in the second direction. See FIGS. 3A-3C and 4B-4C. The first master cylinder may be configured to be engaged by rotation of the operator control in a first direction and the second master cylinder may be configured to be engaged by rotation of the operator control in a second direction. See FIGS. 13 and 14A-14C. The interface may comprise a steer plate coupled to a pushrod for each master cylinder. See FIGS. 11A-11E and 13. The interface may comprise an emulation spring; the steering emulation system may comprise the interface and a compliant element. See FIGS. 11A-11E, 13, 15 and 16.

As shown schematically in FIG. 12B, modulation may comprise the interface providing a modulated relationship between steering angle and torque at the operator control that is different than an unmodulated relationship between steering angle and torque at the operator control. Modulation may comprise stiffness enhancement; modulation may be provided at the second phase to emulate a steering effect; modulation may comprise a steering feel for the operator of the vehicle at the operator control. See FIGS. 3B-3C, 4B-4C,

11A-11D, 12A-12B, 13 and 14A-14C. The interface may comprise a torsion bar (as the compliant member/element in the steer system). See FIGS. 3B-3C, 15 and 16.

According to an exemplary embodiment as shown schematically in FIGS. 3B-3C, the steer system may comprise an interface between the operator control and the brake mechanism; the interface of the steer system/steering system may comprise at least one of (1) a compliant element; (2) a spring; (3) a torsion bar; (4) a compliant element in a piston assembly; (5) an elastomeric element; (6) a coil spring; (7) a flat spring; (8) a cone washer; (9) an air spring; (10) a Belleville spring; (11) a spring washer; (12) a wave spring; (13) a clock spring; (14) a torsion spring; (15) a flexible steer plate; (16) a bump stop; (17) rubber block; (18) a compliant mount; (19) a linkage; (20) a leaf spring; (21) an adjustable steer plate; (22) an adjustable compliant element; (23) a combination of springs; (24) a clevis and spring; (25) multiple compliant elements. See e.g. FIGS. 11A-11E, 12A-12B, 15, 16 and 26A-26E.

According to an exemplary embodiment as shown schematically in FIGS. 3B, 5A-5B and 8A-8B, a steering/braking system for a vehicle having wheels configured to be steered under control of an operator by slowing at least one wheel on one side of the vehicle relative at least one wheel on another side of the vehicle may comprise an operator control; a braking system for braking the vehicle comprising a master cylinder to operate a brake mechanism comprising a caliper and disc for braking a wheel under operation of the operator control; a steering system for steering the vehicle comprising a master cylinder for each side of the vehicle to operate a brake mechanism comprising a caliper and disc for braking a wheel under operation of the operator control. The braking system may comprise a first hydraulic system comprising a fluid circuit for operation of the brake mechanism for slowing and stopping the vehicle; the steering system may comprise a second hydraulic system comprising a fluid circuit for operation of the brake mechanism for steering the vehicle; the fluid circuit for the first hydraulic system may be combined with the fluid circuit for the second hydraulic system. See FIGS. 5A-5B.

The operator control may comprise a handlebar with a lever to provide brake control and rotatable to provide steering control. See FIGS. 2, 3A-3C and 7. The steering system may comprise an interface configured to engage a first master cylinder for a first set of wheels to steer the vehicle in a first direction and a second master cylinder for a second set of wheels to steer the vehicle in the second direction. See FIG. 3A. The interface may be configured for modulation of an effect at the operator control; the interface may be configured to provide a modulated relationship between steering angle and torque at the operator control that may be different than an unmodulated relationship between steering angle and torque at the operator control. See FIGS. 3B-3C, 11A-11E and 12A-12B.

Exemplary Embodiments—B

A steer/brake system for a vehicle having wheels and/or tracks may comprise a steering system. See FIGS. 1 and 2. The vehicle may be configured to be steered under control of an operator by slowing at least one wheel/track on one side of the vehicle relative at least one wheel/track on another side of the vehicle. See FIGS. 4A-4C and 17A-17C. The steering system may comprise an operator control and a braking system for each side of the vehicle comprising a master cylinder to operate a brake mechanism comprising a caliper and disc for braking a wheel/track under operation of the operator control and an interface comprising a compliant element between the braking system and the operator control. The interface may be configured to provide for operation of the braking system for steering under operator control in (1) a first phase where the interface may be engaged before the master cylinder has engaged the caliper and disc of the brake mechanism; (2) a second phase where the interface may be at least partially engaged and force may be applied through the interface to the master cylinder to engage the caliper with the disc of the brake mechanism to provide modulation for the operator control; (3) a third phase where the interface may be fully engaged and force may be applied directly to the master cylinder to engage the caliper with the disc of the brake mechanism. The compliant element of the interface may be configured to provide modulation for the operator control. The braking system may facilitate steering of the vehicle through the operator control and interface by braking of at least one wheel/track on one side of the vehicle by the braking mechanism through the interface. The compliant element may comprise a spring. Modulation may be provided by the stiffness of the spring and by the hydraulic stiffness of the braking system. In the second phase the spring may be at least partially compressed; in the third phase the spring may be fully compressed. In the first phase and the third phase there may be no modulation (e.g. no modulation from the interface of the steer system) for the operator control of the braking system. The braking system may comprise a shared hydraulic system for operation of the steering brake mechanism and the service brake mechanism. The brake mechanism may comprise the steering brake mechanism and the service brake mechanism. The braking system may comprise a separate hydraulic system for operation of the steering brake mechanism and the service brake mechanism. The interface may comprise an emulation spring. The steering emulation system may comprise the interface and a compliant element.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A steering system for a vehicle having wheels configured to be steered under control of an operator by slowing at least one wheel on one side of the vehicle relative at least one wheel on another side of the vehicle comprising:
   (a) an operator control;
   (b) a braking system for each side of the vehicle comprising a master cylinder to operate a brake mechanism for braking a wheel under operation of the operator control;
   (c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism;
   wherein the compliant element of the interface is configured to provide modulation for the operator control;
   wherein the compliant element of the interface comprises a spring mechanism between the operator control and the master cylinder configured to provide modulation for the operator control for the second phase of operation;
   wherein the braking system is configured to facilitate steering of the vehicle through the operator control and interface by braking of at least one wheel on one side of the vehicle by the braking mechanism through the interface.

2. The system of claim 1 wherein the brake mechanism comprises a caliper and disc.

3. The system of claim 1 wherein the spring mechanism of the compliant element comprises a spring.

4. The system of claim 3 wherein modulation is provided by stiffness of the spring.

5. The system of claim 1 wherein modulation is provided by hydraulic stiffness of the braking system.

6. The system of claim 3 wherein in the first phase the spring is uncompressed.

7. The system of claim 3 wherein the first phase comprises a dead stroke of the braking system; wherein the spring of the compliant element of the interface is engaged in a transition from the first phase to the second phase.

8. The system of claim 1 wherein the spring mechanism of the compliant element of the interface comprises at least one of (1) a coil spring mechanism; (2) a set of coil springs; (3) a torsion spring; (4) a torsion bar; (5) a leaf spring; (6) a set of flexible master cylinder mounts; (7) an elastomeric member; (8) a set of disc springs; (9) a wave spring; (10) a dual spring mechanism; (11) a spring configured to at least partially act on a pushrod for a piston assembly of the braking system; (12) a dual spring mechanism configured to at least partially act on a pushrod for a piston assembly of the braking system.

9. The system of claim 3 wherein in the second phase the spring of the spring mechanism of the compliant element of the interface is at least partially compressed.

10. The system of claim 3 wherein the spring of the spring mechanism of the compliant element of the interface is substantially compressed to a limit at a transition from the second phase to the third phase.

11. The system of claim 3 wherein in the third phase the spring is configured to stop at a travel limit.

12. The system of claim 1 wherein in the third phase operation of the braking system is a function of the hydraulic stiffness of the braking system.

13. The system of claim 1 wherein in the third phase there is no modulation from the spring mechanism of the compliant element of the interface for the operator control of the braking system.

14. The system of claim 1 wherein the operator control comprises at least one of (a) a rotatable control or (b) a handlebar or (c) a set of steer levers or (d) a turnable control or (e) a push-pull control.

15. The system of claim 1 wherein the brake mechanism comprises a steering brake mechanism; and wherein the braking system comprises a service brake mechanism for slowing and stopping the vehicle.

16. The system of claim 15 wherein the braking system comprises a shared hydraulic system for operation of the steering brake mechanism and the service brake mechanism.

17. The system of claim 15 wherein the brake mechanism comprises the steering brake mechanism and the service brake mechanism.

18. The system of claim 15 wherein the braking system comprises a shared hydraulic system with a dual-input master cylinder; wherein the dual-input master cylinder comprises a coupling to the operator control and a reservoir for hydraulic fluid; wherein the dual-input master cylinder is configured to supply hydraulic fluid to actuate the steering brake mechanism and the service brake mechanism.

19. A steering system for a vehicle having tracks configured to be steered under control of an operator by slowing at least one track on one side of the vehicle relative at least one track on another side of the vehicle comprising:
   (a) an operator control;
   (b) a braking system for each side of the vehicle comprising a master cylinder to operate a brake mechanism for braking a track under operation of the operator control;
   (c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism;

wherein the compliant element of the interface is configured to provide modulation for the operator control;

wherein the compliant element of the interface comprises a spring mechanism between the operator control and the master cylinder configured to provide modulation for the operator control for the second phase of operation;

wherein the braking system is configured to facilitate steering of the vehicle through the operator control and interface by braking of at least one track on one side of the vehicle by the braking mechanism through the interface.

20. A steering system for a vehicle configured to be steered under control of an operator by slowing at one side of the vehicle relative to another side of the vehicle comprising:
(a) an operator control;
(b) a braking system for each side of the vehicle comprising a master cylinder to operate a brake mechanism for braking under operation of the operator control;
(c) an interface comprising a compliant element between the braking system and the operator control configured to provide for operation of the braking system for steering under operator control in (1) a first phase where the interface is engaged before the master cylinder has engaged the brake mechanism; (2) a second phase where the interface is at least partially engaged and force is applied through the interface to the master cylinder to engage the brake mechanism to provide modulation for the operator control; (3) a third phase where the interface is fully engaged and force is applied directly to the master cylinder to engage the brake mechanism;

wherein the compliant element of the interface is configured to provide modulation for the operator control;

wherein the compliant element of the interface comprises a mechanism between the operator control and the brake mechanism configured to provide modulation for the operator control for the second phase of operation;

wherein the braking system is configured to facilitate steering of the vehicle through the operator control and interface by braking of one side of the vehicle by the braking mechanism through the interface;

wherein the mechanism of the compliant element of the interface comprises at least one of (1) a spring between the operator control and the master cylinder; (2) a spring mechanism; (3) a spring mechanism between the operator control and the master cylinder; (4) a coil spring mechanism between the operator control and the master cylinder; (5) a torsion spring between the operator control and the master cylinder; (6) a torsion bar between the operator control and the master cylinder; (7) a steer arm between the operator control and the master cylinder; (8) a leaf spring between the operator control and the master cylinder; (9) a set of flexible master cylinder mounts; (10) an elastomeric member between the operator control and the master cylinder; (11) a set of disc springs between the operator control and the master cylinder; (12) a wave spring between the operator control and the master cylinder; (13) a set of coil springs; (14) a dual spring mechanism; (15) a mechanism between the operator control and the master cylinder configured to at least partially act on a pushrod for a piston assembly of the braking system; (16) a spring mechanism between the operator control and the master cylinder configured to at least partially act on a pushrod for a piston assembly of the braking system.

* * * * *